US012367729B2

(12) United States Patent
Fukuda et al.

(10) Patent No.: US 12,367,729 B2
(45) Date of Patent: Jul. 22, 2025

(54) SHEET PROCESSING APPARATUS AND SHEET PROCESSING METHOD

(71) Applicant: GLORY LTD., Hyogo (JP)

(72) Inventors: Koki Fukuda, Hyogo (JP); Kisho Yanase, Hyogo (JP); Masashi Kuwada, Hyogo (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/374,716

(22) Filed: Sep. 29, 2023

(65) Prior Publication Data

US 2024/0029496 A1 Jan. 25, 2024

Related U.S. Application Data

(63) Continuation of application No. 16/493,883, filed as application No. PCT/JP2018/008917 on Mar. 8, 2018, now Pat. No. 11,810,416.

(30) Foreign Application Priority Data

Mar. 15, 2017 (JP) ................................ 2017-049793
Mar. 15, 2017 (JP) ................................ 2017-049799

(51) Int. Cl.
*G07D 11/18* (2019.01)
*G07D 7/181* (2016.01)
(Continued)

(52) U.S. Cl.
CPC ............ *G07D 11/18* (2019.01); *G07D 7/181* (2017.05); *G07D 11/125* (2019.01); *G07D 11/14* (2019.01);
(Continued)

(58) Field of Classification Search
CPC ...... G07D 11/10; G07D 11/12; G07D 11/125; G07D 11/13; G07D 11/135; G07D 11/16;
(Continued)

(56) References Cited

U.S. PATENT DOCUMENTS 6,145,737 A 11/2000 Imai et al.
6,481,620 B1 11/2002 Katou et al.
(Continued)

FOREIGN PATENT DOCUMENTS

EP 2555172 A1 2/2013
JP H05-46844 A 2/1993
(Continued)

OTHER PUBLICATIONS

International Search Report issued in International Patent Application No. PCT/JP2018/008917, dated May 22, 2018.
(Continued)

*Primary Examiner* — Edwyn Labaze
*Assistant Examiner* — April A Taylor
(74) *Attorney, Agent, or Firm* — XSENSUS LLP

(57) ABSTRACT

A sheet processing apparatus has: a processing unit having, at a front side of a housing, openings through which at least one of feeding a sheet in the housing or feeding the sheet out from the housing is performed; a storage chamber configured to store the sheet fed in the housing, and a door disposed at an opening part of the storage chamber is capable of being locked; a control unit configured to control transport of the sheet between a container, the openings and the storage chamber, the container configured to be capable of being detachably mounted to the processing unit or the storage chamber and configured to be stored the sheet fed in the sheet processing apparatus; and an attachment unit provided at the back side of the processing unit or on the back side of an outer surface of the storage chamber.

10 Claims, 13 Drawing Sheets

(51) Int. Cl.

| | |
|---|---|
| ***G07D 11/125*** | (2019.01) |
| ***G07D 11/14*** | (2019.01) |
| ***G07D 11/245*** | (2019.01) |
| ***G07D 11/40*** | (2019.01) |

(52) U.S. Cl.
CPC ........... *G07D 11/245* (2019.01); *G07D 11/40* (2019.01); *G07D 2207/00* (2013.01); *G07D 2211/00* (2013.01)

(58) Field of Classification Search
CPC ........ G07D 11/26; G07D 11/40; G07F 19/20; G07F 19/201; G07F 19/202; G07F 19/203; G07F 19/205
See application file for complete search history.

(56) References Cited

U.S. PATENT DOCUMENTS

| | | | | |
|---|---|---|---|---|
| 7,252,185 | B2 | 8/2007 | Fujita et al. | |
| 8,276,901 | B2 | 10/2012 | Taniguchi et al. | |
| 8,708,127 | B2 | 4/2014 | Roosch | |
| 10,109,134 | B2 | 10/2018 | Jeong et al. | |
| 2002/0162775 | A1 | 11/2002 | Saltsov et al. | |
| 2004/0256450 | A1 | 12/2004 | Fujioka | |
| 2015/0243119 | A1 | 8/2015 | Hayashi et al. | |
| 2016/0167912 | A1 | 6/2016 | Jeong et al. | |
| 2018/0040187 | A1* | 2/2018 | Jeong | G07D 11/125 |
| 2018/0204404 | A1 | 7/2018 | Kokubo et al. | |

FOREIGN PATENT DOCUMENTS

| | | | |
|---|---|---|---|
| JP | H6-295369 | A | 10/1994 |
| JP | H08-101969 | A | 4/1996 |
| JP | H09-235061 | A | 9/1997 |
| JP | 2001-118111 | A | 4/2001 |
| JP | 2004-310653 | A | 11/2004 |
| JP | 2012-108640 | A | 6/2012 |
| JP | 2014-160331 | A | 9/2014 |
| JP | 2014-241096 | A | 12/2014 |
| JP | 2016-062427 | A | 4/2016 |
| JP | 2017-027198 | A | 2/2017 |

OTHER PUBLICATIONS

International Preliminary Report on patentability issued in International Patent Application No. PCT/JP2018/008917, dated Sep. 17, 2019.

European Extended Search Report in counterpart European Patent Application No. 18766774.6, dated Nov. 4, 2020.

* cited by examiner

SHEET PROCESSING APPARATUS AND SHEET PROCESSING METHOD

CROSS-REFERENCE TO RELATED APPLICATIONS

The present application is a continuation of U.S. application Ser. No. 16/493,883, filed Sep. 13, 2019, which is based on PCT filing PCT/JP2018/008917, filed Mar. 8, 2018, which claims priority of Japanese Patent Application No. 2017-049799, filed Mar. 15, 2017, and Japanese Patent Application No. 2017-049793, filed Mar. 15, 2017, the entire contents of each are incorporated herein by reference.

TECHNICAL FIELD

The present invention relates to a sheet processing apparatus and a sheet processing method that store, in the sheet processing apparatus, sheets that are fed in or that feed out sheets that are stored in the sheet processing apparatus.

BACKGROUND ART

Conventionally, sheet processing apparatuses that sort sheets such as banknotes on the basis of authenticity, fitness, types of denominations and the like, and that store the sheets are used. Some sheet processing apparatuses include a processing unit that includes an inlet unit and an outlet unit at a front, and a safe that is provided below the processing unit to store the sheets.

One such sheet processing apparatus is disclosed in Patent Literature (hereinafter, abbreviated as PTL) 1. The sheet processing apparatus disclosed in PTL 1 includes a door cover that covers a safe door, and a sheet storage cassette is detachably attached between the safe door and the door cover.

With the sheet processing apparatus, sheets stored in the sheet processing apparatus may be collected in the sheet storage cassette by opening the door cover provided at a front of the sheet processing apparatus and attaching the sheet storage cassette to the sheet processing apparatus.

Another such sheet processing apparatus is disclosed in PTL 2. The sheet processing apparatus disclosed in PTL 2 includes, at a front-side upper portion, an inlet unit where banknotes for depositing are fed in from outside, and includes, at above and behind the inlet unit, a feed-out unit that feeds out rejected banknotes or banknotes for dispensing. The sheet processing apparatus further includes a lower unit that is provided with a front cassette, eight storage chambers and the like. The lower unit includes a cuboid box-shaped housing that is open at a front, and a lid body that opens and closes the front opening of the housing.

With the sheet processing apparatus disclosed in PTL 2, the front cassette and the eight storage chambers disposed inside the housing may be accessed when the lid body is rotated around a lid body rotating shaft and reaches an open state.

CITATION LIST

Patent Literature

PTL 1
U.S. Pat. No. 8,708,127
PTL 2
Japanese Patent Application Laid-Open No. 2017-27198

SUMMARY OF INVENTION

Technical Problem

In a case where the sheet processing apparatus disclosed in PTL 1 is installed at a facility such as a bank, an operation for feeding in or feeding out sheets through the inlet unit or the outlet unit is performed by an operating person such as staff of the facility or a customer. Moreover, an operation for collecting sheets using the sheet storage cassette is performed by a worker at a security transportation service or the like.

With the sheet processing apparatus disclosed in PTL 1, installation positions of the inlet unit and the outlet unit to be used by operating persons, and a position where a worker attaches the sheet storage cassette are on a front side of the sheet processing apparatus. Accordingly, for example, when an operating person is performing an operation of feeding in sheets from the depositing unit, the operating person is in front of the sheet processing apparatus, and a worker is not able to perform work of attaching the sheet storage cassette to the sheet processing apparatus. Even if such attachment may be performed, performing work of collecting sheets from a safe into the sheet storage cassette in a state where the operating person or a large number of unspecified people is present nearby may result in an unexpected situation and is not desirable.

The present invention has been made in view of such circumstances, and an object of the present invention is to improve operability of a sheet processing apparatus.

Solution to Problem

A sheet processing apparatus according to the present invention includes: a processing unit having, at a front side of the sheet processing apparatus, an opening through which at least one of feeding a sheet in the sheet processing apparatus or feeding the sheet out from the sheet processing apparatus is performed; a storage chamber configured to store the sheet fed in the sheet processing apparatus, and a door disposed at an opening part of the storage chamber is capable of being locked; a control unit configured to control transport of the sheet between a container and the storage chamber, the container configured to be capable of being detachably mounted to the processing unit or the storage chamber and configured to be stored the sheet fed in the sheet processing apparatus; and an attachment unit provided at the back side of the processing unit or on the back side of an outer surface of the storage chamber, the attachment unit to which the container is capable of being mounted.

A sheet processing method according to the present invention includes: mounting a container to a back side of a processing unit of a sheet processing apparatus or on a back side of an outer surface of a storage chamber of the sheet processing apparatus, the processing unit having an opening through which at least one of feeding a sheet in the sheet processing apparatus or feeding the sheet out from the sheet processing apparatus is performed, and the storage chamber configured to store the sheet fed in the sheet processing apparatus, and a door disposed at an opening part of the storage chamber is capable of being locked; and transporting the sheet between the storage chamber and the container.

A sheet processing apparatus disclosed in this specification includes: an opening through which at least one of feeding a sheet in the sheet processing apparatus or feeding the sheet out from the sheet processing apparatus is performed; a storage chamber including a plurality of doors each capable of being locked; and a transport unit that transports the sheet between the opening and the storage chamber, in which the plurality of doors are opened from mutually different directions.

Advantageous Effects of Invention

According to the present invention, operability of a sheet processing apparatus may be improved.

DESCRIPTION OF EMBODIMENTS

Hereinafter, the present invention will be described in detail with reference to the accompanying drawings. Additionally, in the following description, "front" of a sheet processing apparatus refers to a side of an operating person who performs at least one of operations for feeding in and feeding out sheets through an opening provided at a processing unit, and "back" of the sheet processing apparatus refers to an opposite side. In other words, "front" of the sheet processing apparatus is a side where the opening for performing at least one of operations for feeding in and feeding out sheets is provided. Furthermore, "left" of the sheet processing apparatus refers to a left side as seen from the operating person, and "right" of the sheet processing apparatus refers to a right side as seen from the operating person.

Furthermore, a "rejected banknote" refers to a banknote that cannot be taken as a processing target in predetermined processing. For example, the "rejected banknote" may be a counterfeit banknote, or banknotes not correctly recognized by a recognition unit, described later, because of passing through the recognition unit in a skewed state or a multi-fed state. A "fit note" refers to a banknote with relatively few stains, tears and the like, and an "unfit note" refers to a banknote with relatively many stains, tears and the like.

(1) Embodiment 1

(1-1) Structure of Sheet Processing Apparatus

Figure 1:
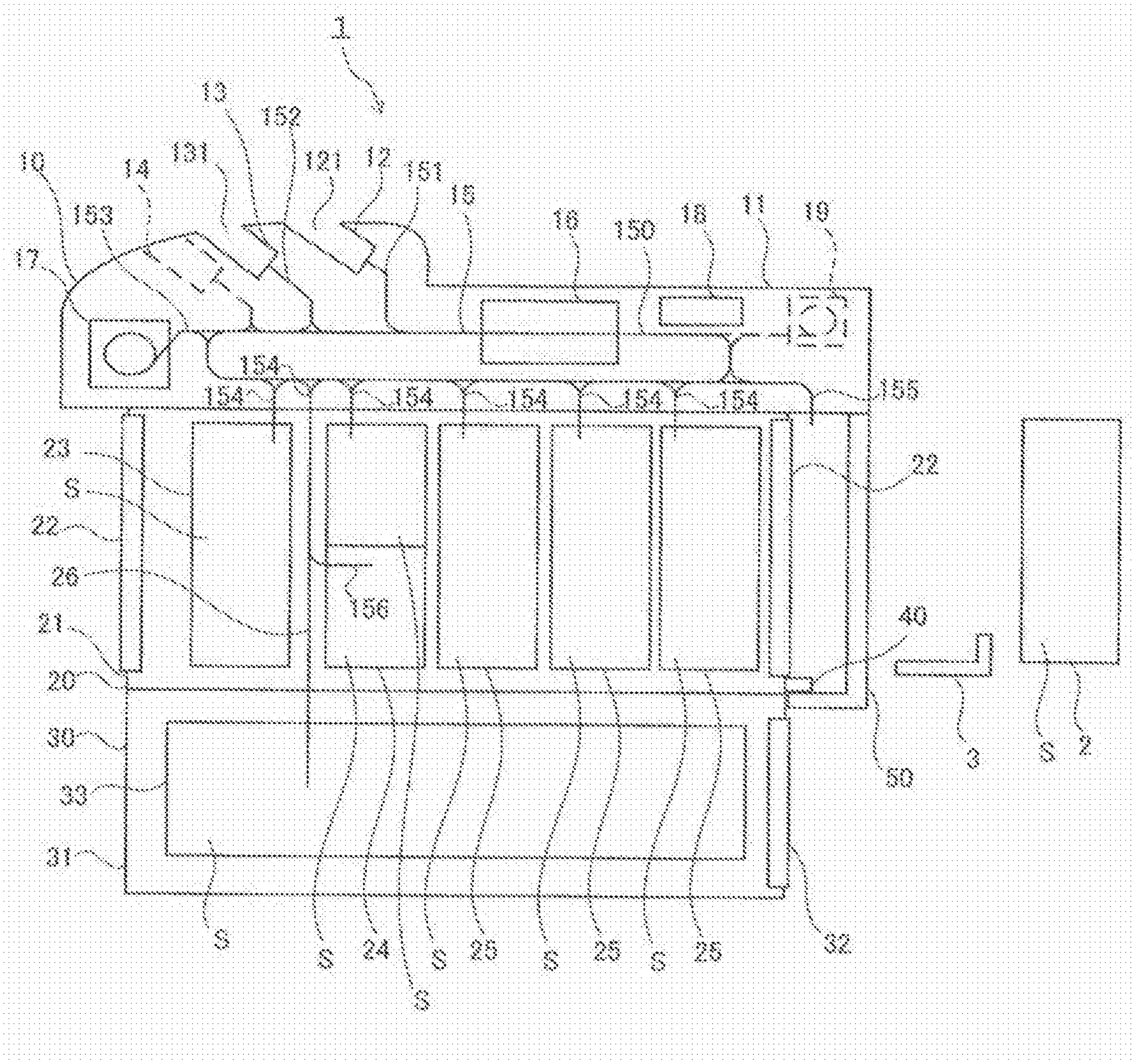
FIG. 1 is a schematic right-side view of a sheet processing apparatus according to Embodiment 1 of the present invention.

FIG. 1 illustrates a banknote processing apparatus 1 as a sheet processing apparatus according to Embodiment 1 of the present invention. In FIG. 1, a left side is a front side of the banknote processing apparatus 1, and a right side is a back side of the banknote processing apparatus 1. Furthermore, FIG. 1 also illustrates a container 2 and an attachment tool 3.

The banknote processing apparatus 1 is a banknote depositing and dispensing machine where banknotes as sheets are deposited and dispensed. The banknote processing apparatus 1 includes a processing unit 10 and a storage chamber 20 provided below the processing unit 10, and a second storage chamber 30 provided below the storage chamber 20. The processing unit 10 can be pulled out forward against the storage chamber 20 and the second storage chamber 30.

The processing unit 10 is covered with an upper housing 11. An inlet 121 having an opening through which a banknote is fed in the banknote processing apparatus and an outlet 131 having an opening through which a banknote is fed out from the banknote processing apparatus are provided at a front side of the upper housing 11, that is, at a front side of the processing unit 10. The processing unit 10 includes a transport unit 15, a recognition unit 16, a temporary storage unit 17, and a control unit 18 inside the upper housing 11.

A banknote feeding mechanism (not illustrated) for feeding out banknotes to the transport unit 15 one by one in a predetermined cycle is disposed near the inlet 121. The inlet 121 and the banknote feeding mechanism configure a depositing unit 12.

A stacking mechanism (not illustrated) for stacking banknotes is disposed near the outlet 131. The outlet 131 and the stacking mechanism configure a dispensing unit 13. A second dispensing unit 14 having a similar structure as the dispensing unit 13 may be provided next to the dispensing unit 13 as necessary.

Additionally, it is also possible to provide only one of the depositing unit 12 or the dispensing unit 13 at the front of the processing unit 10 as necessary. Moreover, a depositing and dispensing unit may be provided by having an opening through which a banknote is fed in the banknote processing apparatus 1 and fed out from the banknote processing apparatus 1, and by disposing the banknote feeding mechanism and the stacking mechanism around the opening.

The transport unit 15 transports banknotes at a predetermined transport speed. The transport unit 15 is configured by a belt mechanism and a roller mechanism for transporting banknotes. The transport unit 15 includes a loop transport path 150 enabling bi-directional transport of banknotes, and a first diversion path 151, a second diversion path 152, a third diversion path 153, fourth diversion paths 154, and a fifth diversion path 155 diverged from the loop transport path 150. The first diversion path 151 to the fifth diversion path 155 connect the loop transport path 150 to, respectively, the depositing unit 12, the dispensing unit 13, the temporary storage unit 17, the storage chamber 20 and the second storage chamber 30, and the container 2 which is capable of being detachably mounted to the banknote processing apparatus described later.

The recognition unit 16 includes a sensor such as an image sensor, an optical sensor, or a magnetic sensor, and recognizes authenticity, denomination, fitness and the like of banknotes transported by the transport unit 15.

The temporary storage unit 17 temporarily stores banknotes. The temporary storage unit 17 takes in and stores banknotes one by one, and feeds out the stored banknotes one by one. For example, the temporary storage unit 17 may be a winding storage unit where a plurality of sheets are stored in a state of being wound around a rotary body. Furthermore, the temporary storage unit 17 may be configured by a stacking storage where a plurality of sheets are stored in a stacked state.

The control unit 18 includes at least a CPU and a memory. The control unit 18 controls each unit configuring the banknote processing apparatus 1 and the container 2 such that banknotes are transported, via the transport unit 15, among the depositing unit 12, the dispensing unit 13, the temporary storage unit 17, the storage chamber 20, the second storage chamber 30, and the container 2 described later.

The storage chamber 20 may be, for example, a safe, and forms a lower housing 21. A door 22 is disposed at an opening part of each of the front side and the back side of the storage chamber 20. Additionally, in the present specification, the "door" refers collectively to a member that can open or close the opening part provided at the lower housing 21. Accordingly, for example, the "door" includes a door that is attached to the opening part of the lower housing 21 by a hinge, a sliding door that is slidable along the lower housing 21, a plate member that can contact with and separate from the lower housing 21, and the like.

The door 22 on the front side may be opened from the front side of the storage chamber 20, and the door 22 on the back side may be opened from the back side of the storage chamber 20. Because the door 22 is provided at the front of the storage chamber a person who operates the banknote processing apparatus 1 from the front side may easily access the inside of the storage chamber 20 through the opening part when the door 22 is opened. Furthermore, because the door 22 is provided on the back side of the storage chamber 20, a person who operates the banknote processing apparatus 1 from the back side by using the container 2 to be mounted detachably described later may easily access the inside of the storage chamber 20 through the opening part when the door 22 is opened. In the case where the person who operates the door 22 on the front side and the person who operates the door 22 on the back side are different, keys for unlocking the doors 22 or information to be input to unlock the doors 22 may be made different. It is also possible to provide the door 22 only on the front side or the back side of the storage chamber 20 as necessary.

Inside the storage chamber 20, one multipurpose storage unit 23, one first storage unit 24, and three second storage units 25 are arranged in the order presented from the front side. Furthermore, a vertical transport path 26 is disposed between the multipurpose storage unit 23 and the first storage unit 24.

The multipurpose storage unit 23 includes a storage space S where a plurality of sheets are stored in a stacked state. The multipurpose storage unit 23 is a banknote storage that may be used for various purposes, and is used to store overflow banknotes, dispensation rejected banknotes, forgotten banknotes, counterfeit notes, and suspect notes, for example. The overflow banknotes are banknotes that cannot be stored in the storage for storing the same (the first storage unit 24 or the second storage unit 25) because the storage is full. Furthermore, the dispensation rejected banknotes are banknotes, among the banknotes which are fed out from the first storage unit 24 or the second storage unit 25 at the time of a dispensing process of banknotes which are not recognized normally by the recognition unit 16 due to abnormal transport such as skewing. Moreover, the forgotten banknotes are banknotes for which a predetermined period of time passed without the banknotes being removed from the dispensing unit 13 after the banknotes are dispensed to the dispensing unit 13.

The first storage unit 24 includes two storage spaces S that are vertically next to each other. The storage space S on the upper side is connected to the fourth diversion path 154, and the storage space S on the lower side is connected to a sixth diversion path 156 provided on the vertical transport path 26. These two storage spaces S are stacking storage spaces where a plurality of sheets are stored in a stacked state or winding storage spaces where a plurality of sheets are stored in a state of being wound around a rotary body. Banknotes of a specific type among banknotes sorted on the basis of authenticity, fitness, denomination or the like are stored in the storage spaces S.

The second storage unit 25 includes one storage space S that is connected to the fourth diversion path 154. The storage space S is a storage space where a plurality of sheets are stored in a stacked state. Banknotes of a specific type among banknotes sorted on the basis of authenticity, fitness, denomination or the like are stored in the storage space S.

The vertical transport path 26 connects the fourth diversion path 154 and a collection unit 33 disposed inside the second storage chamber 30.

The second storage chamber 30 may be, for example, a safe, and forms a bottom housing 31, and also, includes a lockable second door 32 on the back side. Furthermore, the second storage chamber 30 includes the collection unit 33 on the inside. The collection unit 33 includes a storage space S. The banknotes among the banknotes deposited from the depositing unit 12 and the banknotes stored in the storage chamber 20 are stored in the storage space S to be collected. After the banknotes to be collected are stored inside, the banknotes are collected by a collection worker from inside the collection unit 33. Alternatively, after the banknotes to be collected are stored inside, the collection unit 33 is removed by the collection worker from the banknote processing apparatus 1, and is collected together with the banknotes. An empty collection unit 33 is then attached instead.

Moreover, the banknote processing apparatus 1 according to the present embodiment includes an attachment unit 40 on the back side of the outer surface of the storage chamber 20 for mounting the container 2 to the banknote processing apparatus 1. Additionally, an outer surface of the storage chamber 20 can be accessed without unlocking the locked door 22, and is, specifically, an outer surface of the lower housing 21 or an outer surface of the door 22.

The attachment unit 40 includes a terminal (not illustrated) for supplying at least one of power or a control signal from the control unit 18 to the container 2, and a terminal cover (not illustrated) that covers the terminal. The attachment unit 40 is provided outside the storage chamber 20, and is thus easily stained or damaged. However, providing the terminal cover may prevent the terminal from being stained or damaged. Moreover, the container 2 includes a terminal (not illustrated) to be connected to the terminal of the attachment unit 40.

The shape and structure of the attachment unit 40 are not particularly limited as long as the attachment unit 40 is capable of connecting the fifth diversion path 155 and the storage space S inside the container 2 that is capable of being mounted directly or via the attachment tool 3, and of supplying at least one of power or the control signal to the container 2 via the terminals. For example, a structure for supporting the container 2 from below, or a structure for sandwiching the container 2 from above and below or from left and right may be included.

In the case where the container 2 is mounted to the attachment unit 40 via the attachment tool 3, the terminal of the attachment unit 40 and the terminal of the container 2 may, of course, be directly connected, or the terminals may instead be connected indirectly via two terminals provided at the attachment tool 3.

Additionally, the terminal cover desirably includes a mechanism that opens or closes automatically in coordination with a part of the container 2, in accordance with attachment or detachment of the container 2 to the attachment unit 40. Various known mechanisms exist as such an opening/closing mechanism, and any one of the mechanisms may be adopted.

Furthermore, the banknote processing apparatus 1 according to the present embodiment includes a cover 50 that covers a back side of the storage chamber 20. For example, the cover 50 is attached to the back outer surface of the storage chamber 20 by a hinge that is provided on the left side of the banknote processing apparatus 1 (that is, on the right side when seen from the back of the banknote processing apparatus 1). When the cover 50 is closed, the attachment unit 40 is covered by the cover 50.

The container 2 includes a storage space S on the inside. The storage space S is a stacking storage space where a plurality of sheets are stored in a stacked state or a winding storage space where a plurality of sheets are stored in a state of being wound around a rotary body. The container 2 stores banknotes inside the storage space S, and includes a drive mechanism (not illustrated) including a motor and the like for dispensing the banknotes to outside the storage space S. The container 2 does not necessarily include the drive mechanism. In such a case, the banknote processing apparatus 1 may include a drive mechanism, and drive may be transmitted to the container 2 that is mounted.

The attachment tool 3 is a tool that holds the container 2 in a state of being mounted to the attachment unit 40. Shape and structure thereof are not particularly limited. For example, a tool that is folded and stored inside the cover 50 when not used, and that is expanded to hold the container 2 at the time of use may be adopted. A tool that is mounted to the banknote processing apparatus 1 every time the container 2 is amounted, and that is removed from the banknote processing apparatus 1 every time the container 2 is removed may also be adopted as a matter of course.

Figure 2:
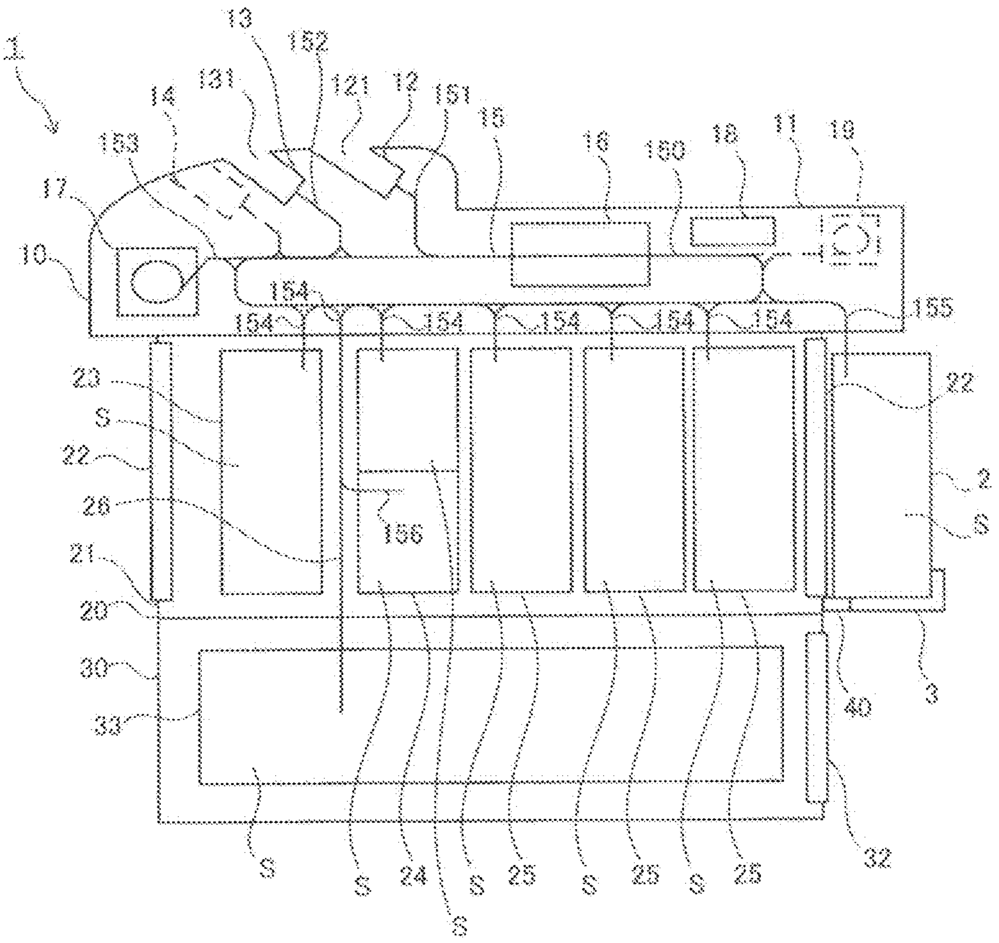
FIG. 2 is a schematic right-side view of the sheet processing apparatus according to Embodiment 1 of the present invention, to which a container is mounted.

A state where the cover 50 is opened, and the container 2 is mounted to the attachment unit 40 via the attachment tool 3 is illustrated in FIG. 2. Additionally, in FIG. 2, illustration of the cover 50 is omitted for the sake of convenience. At this time, the storage space S inside the container 2 is connected to the fifth diversion path 155, and the banknote processing apparatus 1 is enabled to operate a motor mechanism provided at the container 2.

With the banknote processing apparatus 1 according to the present embodiment, in a state where the container 2 is mounted to the attachment unit 40, the cover 50 cannot be closed due to interference by the container 2. Accordingly, an operating person can constantly view the container 2 while the container 2 is mounted to the attachment unit 40. Accordingly, an operating person who has mounted the container 2 to the attachment unit 40 may be prevented from forgetting to remove the container 2 after banknote processing.

(1-2) Banknote Processing not Using Container to be Detachably Mounted

Next, banknote processing by the banknote processing apparatus 1 will be described. First, processes that can be performed regardless of whether the container 2 is mounted or not will be described. Additionally, such processes are merely examples of processes that can be performed by the banknote processing apparatus 1.

(1-2-1) Deposit Process

A deposit process is a process of recognizing a banknote which is fed from the depositing unit 12, and of storing a banknote that is normally recognized in the banknote processing apparatus 1.

When an operating person issues a depositing instruction to the banknote processing apparatus 1 via an operation unit not illustrated, and feeds a banknote into the depositing unit 12, the banknote that is fed into the depositing unit 12 is supplied to the recognition unit 16 via the first diversion path 151 and the loop transport path 150. The recognition unit 16 recognizes and counts the banknote.

The transport unit 15 stores the banknote in the predetermined first storage unit 24 or second storage unit 25 according to a positive recognition result and an allocated storage that is set in advance. That is, each banknote is sorted on the basis of denomination and fitness, and is stored in the storage chamber 20.

Additionally, banknotes of denominations and unfit notes allocation of which to the first storage unit 24 and the second storage unit 25 is not set are stored in the multipurpose storage unit 23 or the collection unit 33. Moreover, the overflow banknotes are also stored in the multipurpose storage unit 23 or the collection unit 33.

The transport unit 15 feeds out a rejected banknote to the dispensing unit 13. Additionally, a rejected banknote occurring at the time of the deposit process is fed to the depositing unit 12 again, and recognition by the recognition unit 16 is performed again.

Additionally, in a case where a depositing/dispensing unit is provided at the processing unit 10, or in other words, in a case where there is only one opening, if there is a rejected banknote at the time of the deposit process, the rejected banknote is temporarily stored in the temporary storage unit 17. The rejected banknote is returned to the depositing and dispensing unit when the depositing and dispensing unit is empty.

(1-2-2) Dispensing Process

A dispensing process is a process of feeding out banknotes stored in the banknote processing apparatus 1.

When an operating person issues a dispensing instruction to the banknote processing apparatus 1 via the operation unit not illustrated, the banknote processing apparatus 1 feeds out, from the first storage unit 24 or the second storage unit 25, a specified number of banknotes of a specified denomination. The transport unit 15 transports the fed-out banknotes to the recognition unit 16, and the recognition unit 16 recognizes the banknotes. Then, normally recognized banknotes are fed out to the dispensing unit 13.

A rejected banknote occurring at the time of the dispensing process is transported and stored in the temporary storage unit 17. After the dispensing process is ended, the banknote that is stored in the temporary storage unit 17 is stored, as necessary, in the multipurpose storage unit 23, the first storage unit 24, the second storage unit 25, or the collection unit 33.

(1-2-3) First Replenishing Process

A first replenishing process is a process of feeding out banknotes which are deposited in the depositing unit 12 for the purpose of replenishment from the depositing unit 12 and recognizing the banknotes, and of storing normally recognized banknotes in the banknote processing apparatus 1. According to the first replenishing process, banknotes desired to be replenished are fed out from the depositing unit 12 into the banknote processing apparatus 1, and consequently, the banknotes can be replenished in the first storage unit 24 or the second storage unit 25 where the banknotes are to be stored. A basic flow of banknote processing is the same as that of the deposit process.

(1-2-4) First Collection Process

A first collection process is a process of feeding out to the dispensing unit 13 banknotes that are stored in the banknote processing apparatus 1 and that are to be collected. According to the first collection process, banknotes to be collected are fed outside the banknote processing apparatus 1 from the first storage unit 24 or the second storage unit 25, and the banknotes may thereby be collected from each storage storing the banknotes. A basic flow of banknote processing is the same as that of the dispensing process.

(1-3) Banknote Processing Using Container to be Detachably Mounted

Next, banknote processing performed by the banknote processing apparatus 1 to which the container 2 is mounted will be described. Additionally, the processes are merely examples of processes that can be performed by the banknote processing apparatus 1.

(1-3-1) Second Replenishing Process

A second replenishing process is a process of storing banknotes fed out from the container 2 in the first storage unit 24 or the second storage unit 25 disposed inside the storage chamber 20. According to the second replenishing process, banknotes desired to be replenished are stored together in the container 2, and are replenished in the first storage unit 24 or the second storage unit 25 where the banknotes are to be stored.

When an operating person who has mounted the container 2 to the banknote processing apparatus 1 operates the banknote processing apparatus 1 after mounting the container 2 to the banknote processing apparatus 1, the second replenishing process is started. Additionally, such an operation is performed through an operation unit, not illustrated, provided at the back of the banknote processing apparatus 1 or through an operation apparatus that is connected to the banknote processing apparatus 1 by a cable or wirelessly.

The transport unit 15 receives the banknote from the container 2 via the fifth diversion path 155, and transports the banknote to the recognition unit 16. A normally recognized banknote is transported and stored in the first storage unit 24 or the second storage unit 25 according to the allocated storage that is set in advance. A banknote that is not normally recognized, such as an unfit note or a banknote that is recognized to be of a denomination that is not set, is transported and stored in the multipurpose storage unit 23 or the collection unit 33.

Additionally, the front side and the back side of the banknote processing apparatus 1 are sometimes separated from each other, such as in a case where the banknote processing apparatus 1 is installed by being inserted halfway into a through hole provided in a wall. In such a case, if a rejected banknote occurring at the time of the second replenishing process (hereinafter "second rejected banknote") is fed out from the dispensing unit 13 in the same manner as the rejected banknote occurring at the time of the deposit process or the first replenishing process (hereinafter "first rejected banknote"), the second rejected banknote possibly becomes lost due to an unexpected event. For example, in a case where it takes a certain amount of time to move from the back side of the banknote processing apparatus 1 to the front side, a malicious party near the dispensing unit 13 may possibly steal the second rejected banknote before an operating person performing the second replenishing process reaches the front side of the banknote processing apparatus 1.

Accordingly, the first rejected banknote and the second rejected banknote are desirably transported to different transport destinations. Specifically, the first rejected banknote is transported to the dispensing unit 13, and the second rejected banknote is transported and stored in the multipurpose storage unit 23, the temporary storage unit 17, or the collection unit 33. This may prevent the second rejected banknote from becoming lost due to an unexpected event.

Furthermore, a storage unit 19 dedicated to rejected banknotes may be provided at the banknote processing apparatus 1, as illustrated by broken lines in FIGS. 1 and 2, to be allocated as the transport destination of the second rejected banknotes.

(1-3-2) Second Collection Process

A second collection process is a process of transporting and storing, in the container 2, banknotes that are stored in the multipurpose storage unit 23, the first storage unit 24, or the second storage unit 25.

When an operating person who has mounted the container 2 to the banknote processing apparatus 1 operates the banknote processing apparatus 1 after mounting the container 2 to the banknote processing apparatus 1, the second collection process is started. Additionally, such an operation is performed through an operation unit, not illustrated, provided at the back of the banknote processing apparatus 1 or through an operation apparatus that is connected to the banknote processing apparatus 1 by a cable or wirelessly.

When the second collection process is started, a predetermined number of banknotes are sequentially fed out to the transport unit 15 from the multipurpose storage unit 23, the first storage unit 24, or the second storage unit 25 storing collection-target banknotes. A banknote that is fed out is transported to the recognition unit 16 to be recognized. A banknote which is determined to be normal as a result of recognition is transported and stored in the container 2 to be mounted detachably. A banknote that is recognized to be a rejected banknote as a result of recognition is stored in the temporary storage unit 17, the collection unit 33, the storage unit 19 dedicated to rejected banknotes, or the like. Additionally, the number of banknotes to be fed out is manually input by an operating person through an operation unit, not illustrated, or the like, or is determined by being selected from predetermined options.

Additionally, it is also possible to collect all the banknotes in each storage, instead of collecting a predetermined number of banknotes. The process of collecting all the banknotes is a process by which it is sufficient if the storage is emptied, and thus, banknotes fed out from each storage may or may not be recognized by the recognition unit 16. Furthermore, transport to the container 2 may be performed directly without through the recognition unit 16.

Furthermore, as described above, a rejected banknote occurring at the time of the dispensing process or the first collection process (hereinafter "third rejected banknote") is transported and stored in the temporary storage unit 17. If a rejected banknote occurring at the time of the second collection process (hereinafter "fourth rejected banknote") is transported to the temporary storage unit 17 in the same manner, transport paths of the banknote that is transported from each storage to the recognition unit 16 and the banknote that is transported to the temporary storage unit 17 after being recognized by the recognition unit 16 may coincide, thereby possibly stopping transport of the banknotes.

Accordingly, the third rejected banknote and the fourth rejected banknote are desirably transported and stored in different transport destinations. Specifically, the third rejected banknote is transported and stored in the temporary storage unit 17, and the fourth rejected banknote is transported and stored in the storage unit 19 dedicated to rejected banknotes. This may prevent transport of banknotes from being stopped.

(1-3-3) Reconciliation Process

A reconciliation process is a process of performing reconciliation of a banknote that is stored in the multipurpose storage unit 23, the first storage unit 24, or the second storage unit 25.

The reconciliation process is started when an operating person operates the banknote processing apparatus 1 after mounting an empty container 2 to the banknote processing apparatus 1. Additionally, such an operation is performed through an operation unit, not illustrated, provided at the back of the banknote processing apparatus 1 or through an operation apparatus that is connected to the banknote processing apparatus 1 by a cable or wirelessly.

The multipurpose storage unit 23, the first storage unit 24, or the second storage unit 25 as the reconciliation target feeds out banknotes that are stored therein one by one. The transport unit 15 transports the fed-out banknote to the recognition unit 16. The recognition unit 16 preforms recognition of the banknote. A banknote that is normally recognized is transported and stored in the container 2. On the other hand, a rejected banknote is transported and stored in the temporary storage unit 17, the collection unit 33, the storage unit 19 dedicated to rejected banknotes, or the like.

When recognition of all the banknotes stored in one storage among the multipurpose storage unit 23, the first storage unit 24, or the second storage unit 25 as the reconciliation target is complete, the banknotes stored in the container 2 are fed out one by one, and are transported by the transport unit 15 to the original storage, that is, the storage as the reconciliation target. Recognition may again be performed at this time by the recognition unit 16. After the recognition is performed again, a normally recognized banknote is stored in the original storage, that is, the storage as the reconciliation target. A rejected banknote is stored in the temporary storage unit 17, the collection unit 33, the storage unit 19 dedicated to rejected banknotes, or the like.

Furthermore, in the case where the rejected banknote is to be stored in the temporary storage unit 17, a recognition timing for the banknote at the time of the reconciliation process may be set according to the position of the temporary storage unit 17. Specifically, in a case where the temporary storage unit 17 is on the front side of the processing unit 10 (the position of the temporary storage unit 17 in FIG. 1), recognition is performed at the time of transport from the container 2 to the storage as the reconciliation target. In a case where the temporary storage unit 17 is on the back side of the processing unit (the position of the storage unit 19 dedicated to rejected banknotes in FIG. 1), recognition is performed at the time of transport from the storage as the reconciliation target to the container 2. By setting the recognition timing in this manner, the transport path of the banknote being subjected to the reconciliation process and the transport path of the rejected banknote do not coincide with each other even if a rejected banknote occurs at the time of the reconciliation process, and thus, the rejected banknote may be stored in the temporary storage unit 17 without stopping transport of banknotes.

(1-3-4) Other Processes

Depending on the intended use of the banknote processing apparatus 1, users' needs and the like, the temporary storage unit 17 is sometimes not provided. However, the temporary storage unit 17 may become necessary at a later timing, and in such a case, it is generally difficult to provide the temporary storage unit 17 at such a timing.

In contrast, with the banknote processing apparatus 1 according to the present embodiment, the container 2 which may implement the function of the temporary storage unit 17 may be easily mounted. Accordingly, the deposit process and the dispensing process described above may be performed by mounting the container 2 to the banknote processing apparatus 1, instead of the temporary storage unit 17 for storing the rejected banknotes.

When various processes described above are performed, a large amount of cash is possibly collected at the container 2. Accordingly, from the standpoint of security, it is not desirable to provide the container 2 on the front side of the banknote processing apparatus 1, which can be relatively easily accessed by a large number of unspecified people. With the banknote processing apparatus 1 according to the present embodiment, the container 2 is mounted on the back side of the banknote processing apparatus 1. Accordingly, it is relatively difficult for a large number of unspecified people to access the container 2 where a large amount of cash is possibly collected. Accordingly, even if there are an operating person operating the depositing unit 12 or the dispensing unit 13 and a large number of unspecified people in front of the banknote processing apparatus 1, the container 2 may be mounted on the back side of the banknote processing apparatus 1 and banknote processing may be performed without being obstructed by such people.

(2) Embodiment 2

Figure 3:
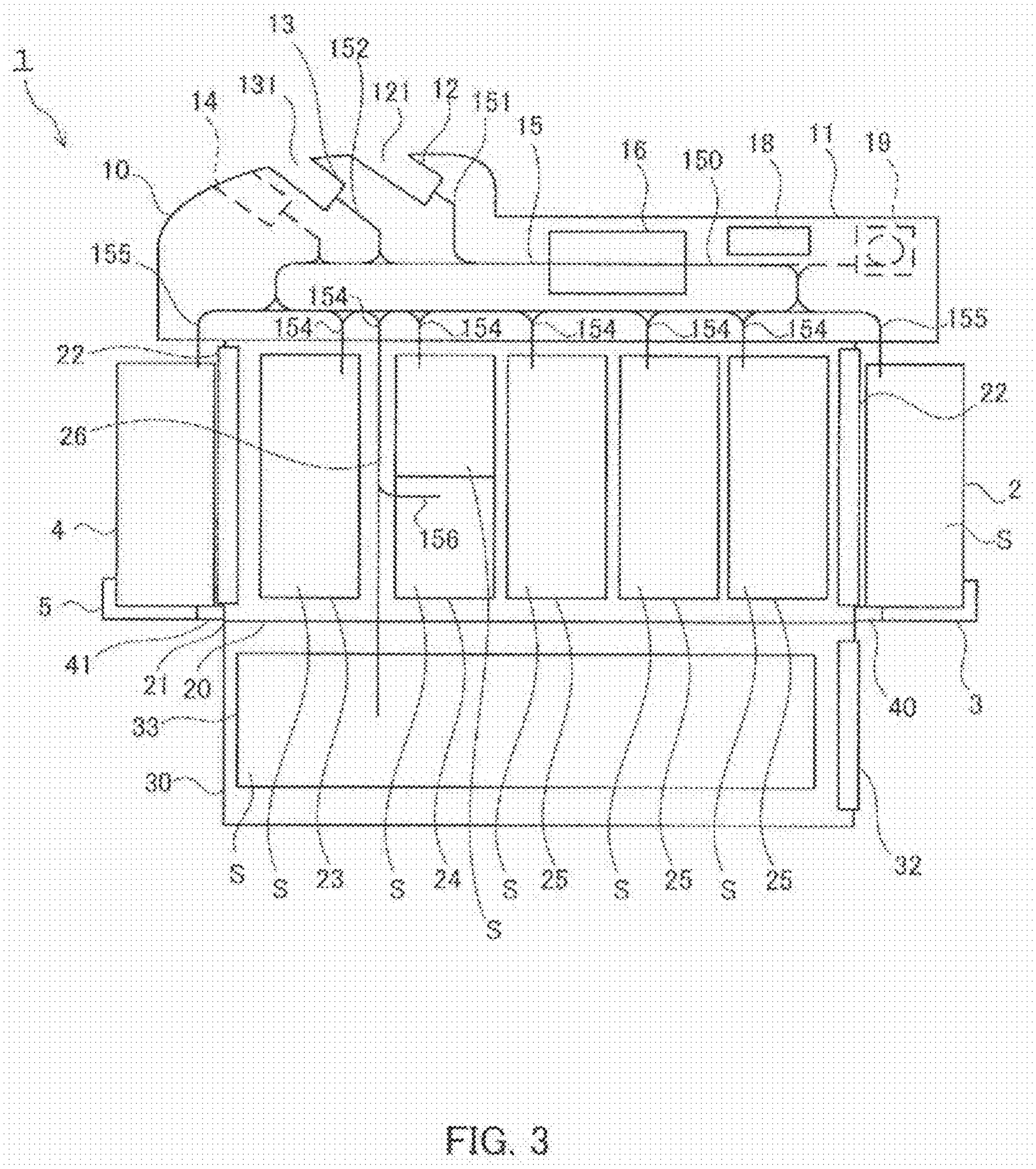
FIG. 3 is a schematic right-side view of a sheet processing apparatus according to Embodiment 2 of the present invention.

FIG. 3 illustrates the banknote processing apparatus 1 as a sheet processing apparatus according to Embodiment 2 of the present invention. In FIG. 3, a left side is a front side of the banknote processing apparatus 1, and a right side is a back side of the banknote processing apparatus 1.

The banknote processing apparatus 1 according to the present embodiment is different from the banknote processing apparatus 1 according to Embodiment 1 in that the temporary storage unit 17 is not provided, and that a second attachment unit 41 is provided on the front side of the storage chamber 20. Other structures are the same, and the banknote processing apparatus 1 according to Embodiment 2 may perform similar banknote processing as the banknote processing apparatus 1 according to Embodiment 1. Additionally, in FIG. 3, illustration of the cover 50 is omitted.

A second container 4 which is capable of being detachably mounted to the banknote processing apparatus may be mounted to the second attachment unit 41 by a second attachment tool 5. The second attachment unit 41 has a same structure as the attachment unit 40. The second attachment tool 5 has a same structure as the attachment tool 3. The second container 4 has a same structure as the container 2.

In the present embodiment, the second container 4 may be caused to function as a temporary storage unit for deposit at the time of the deposit process.

Specifically, the second container 4 includes a lid, and banknotes inside may be taken out by opening the lid. Moreover, the lid may be opened even when the second container 4 is mounted to the second attachment unit 41. This enables banknotes stored in the second container 4 to be returned to an operating person when the deposit process is cancelled, by the operating person taking out the banknotes directly from the second container 4. Accordingly, like the depositing unit 12 and the dispensing unit 13, it is convenient to provide the second container 4 on the front side of the banknote processing apparatus 1.

With the banknote processing apparatus 1 according to the present embodiment, in the case where the function of the temporary storage unit is not necessary, the overall structure may be made compact by not mounting the second container 4. Furthermore, if the function of the temporary storage unit becomes necessary, such a circumstance may be easily processed by mounting the second container 4.

(3) Embodiment 3

Figure 4:
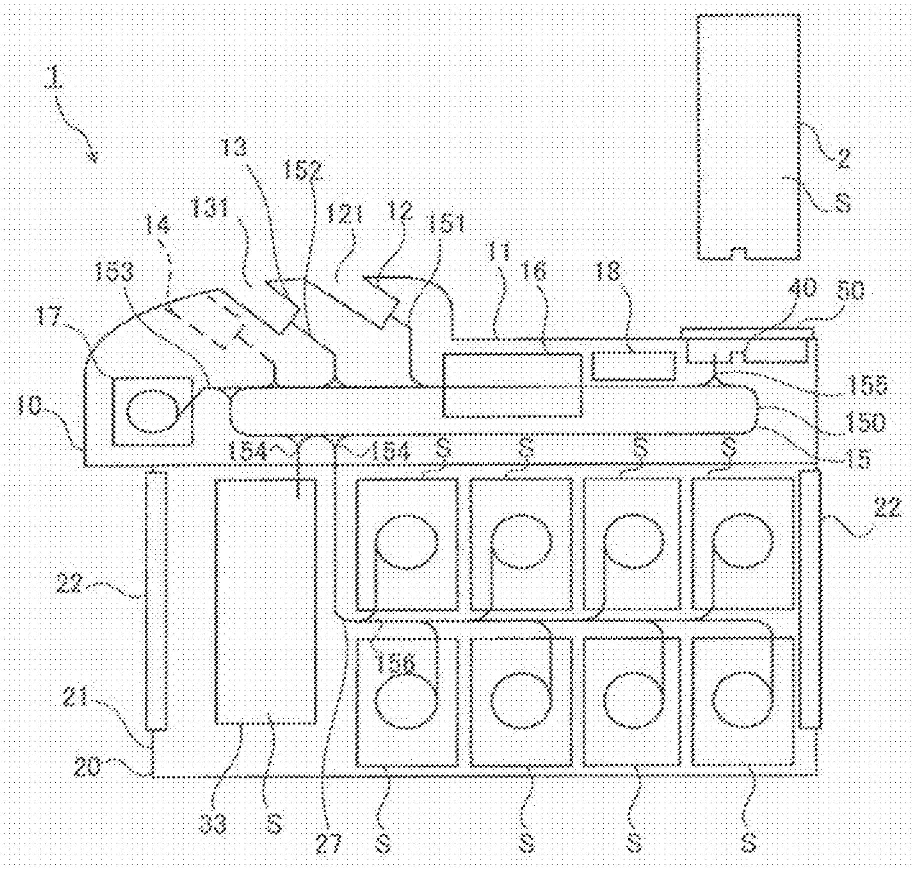
FIG. 4 is a schematic right-side view of a sheet processing apparatus according to Embodiment 3 of the present invention.

FIG. 4 illustrates the banknote processing apparatus 1 as a sheet processing apparatus according to Embodiment 3 of the present invention. In FIG. 4, a left side is a front side of the banknote processing apparatus 1, and a right side is a back side of the banknote processing apparatus 1.

The banknote processing apparatus 1 according to the present embodiment is different from the banknote processing apparatus 1 according to Embodiment 1 in that the second storage chamber 30 is not provided.

Furthermore, the banknote processing apparatus 1 according to the present embodiment is different from the banknote processing apparatus 1 according to Embodiment 1 with respect to an internal structure of the storage chamber 20. That is, with the banknote processing apparatus 1 according to the present embodiment, eight storage spaces S are provided inside the storage chamber 20, and the storage spaces S are each a winding storage space where a plurality of sheets are stored in a state of being wound around a rotary body. Moreover, a bent transport path 27 that extends while being bent in an L shape in a side view, and that connects the loop transport path 150 and the eight storage spaces S is provided inside the storage chamber 20. Furthermore, the collection unit 33 is disposed on the front side in the storage chamber 20. The collection unit 33 includes one storage space S. The storage space S is a stacking storage space where a plurality of sheets are stored in a stacked state. The function thereof is the same as that of the collection unit 33 of the banknote processing apparatus 1 according to Embodiment 1.

Moreover, the banknote processing apparatus 1 according to the present embodiment is different from the banknote processing apparatus 1 according to Embodiment 1 in that the attachment unit 40 is provided at the back side of the processing unit 10. In the present embodiment, an opening is provided at the upper housing 11, and the cover 50 that covers the opening is further provided. Additionally, the attachment unit 40 may be provided on any outer surface of the processing unit 10 as long as the position is on the back side of the processing unit 10. Also in such a case, the cover 50 that covers the attachment unit 40 may be provided at the upper housing 11 as a matter of course.

Other structures of the banknote processing apparatus 1 according to the present embodiment are the same as the structures of the banknote processing apparatus 1 according to Embodiment 1.

With the banknote processing apparatus 1 according to the present embodiment configured in the above manner, the container 2 may be mounted to the attachment unit 40 by opening the cover 50. Accordingly, also in the present embodiment, banknote processing may be performed in the same manner as by the banknote processing apparatus 1 according to Embodiment 1, and advantageous effects similar to those of the banknote processing apparatus 1 according to Embodiment 1 may be achieved. Additionally, also with the banknote processing apparatus 1 according to the present embodiment, the attachment unit 40 may be configured such that the container 2 may be mounted by an attachment tool.

(4) Embodiment 4

Figure 5:
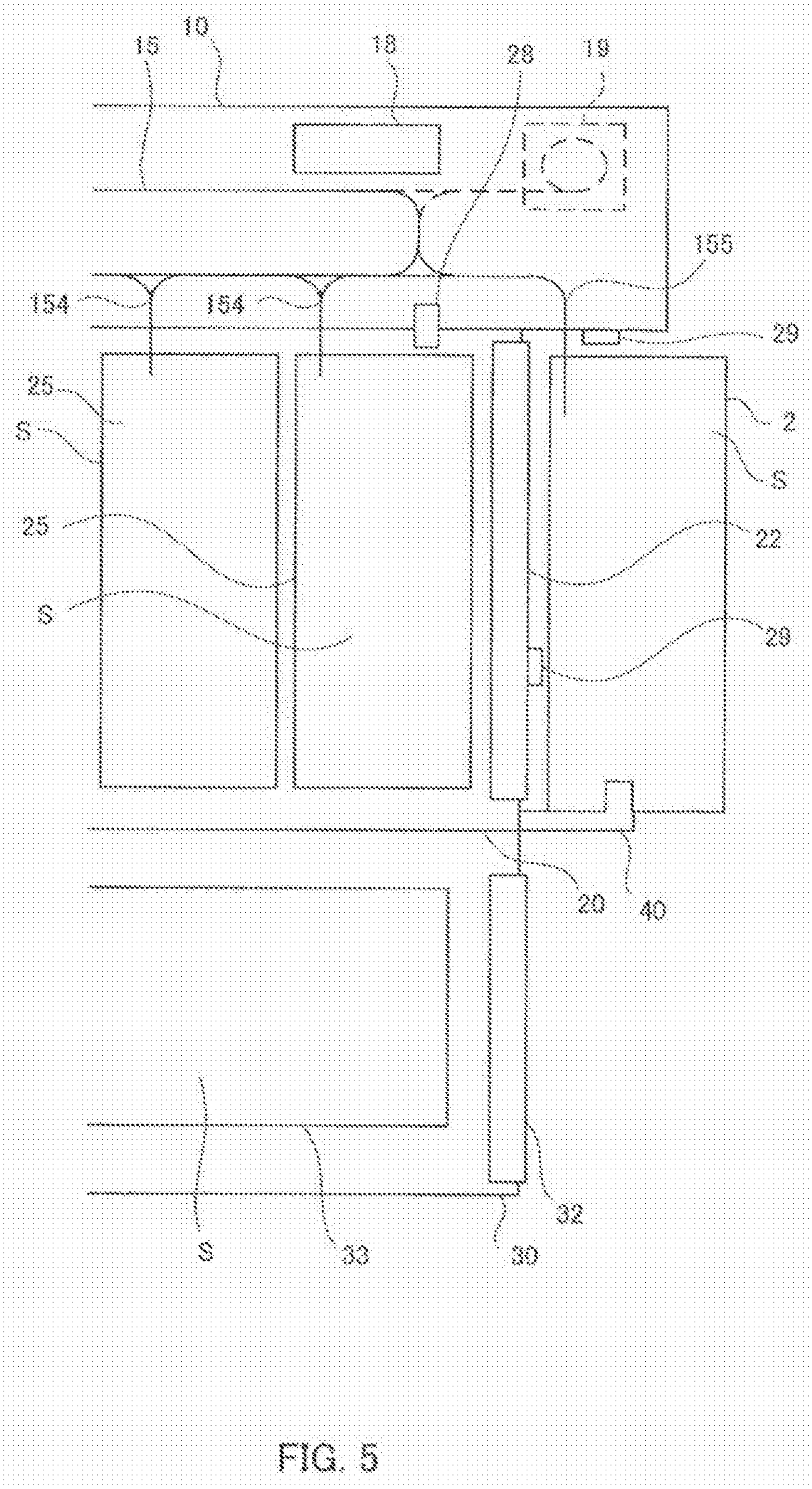
FIG. 5 is a schematic right-side view of a back side of a sheet processing apparatus according to Embodiment 4 of the present invention.
Figure 6:
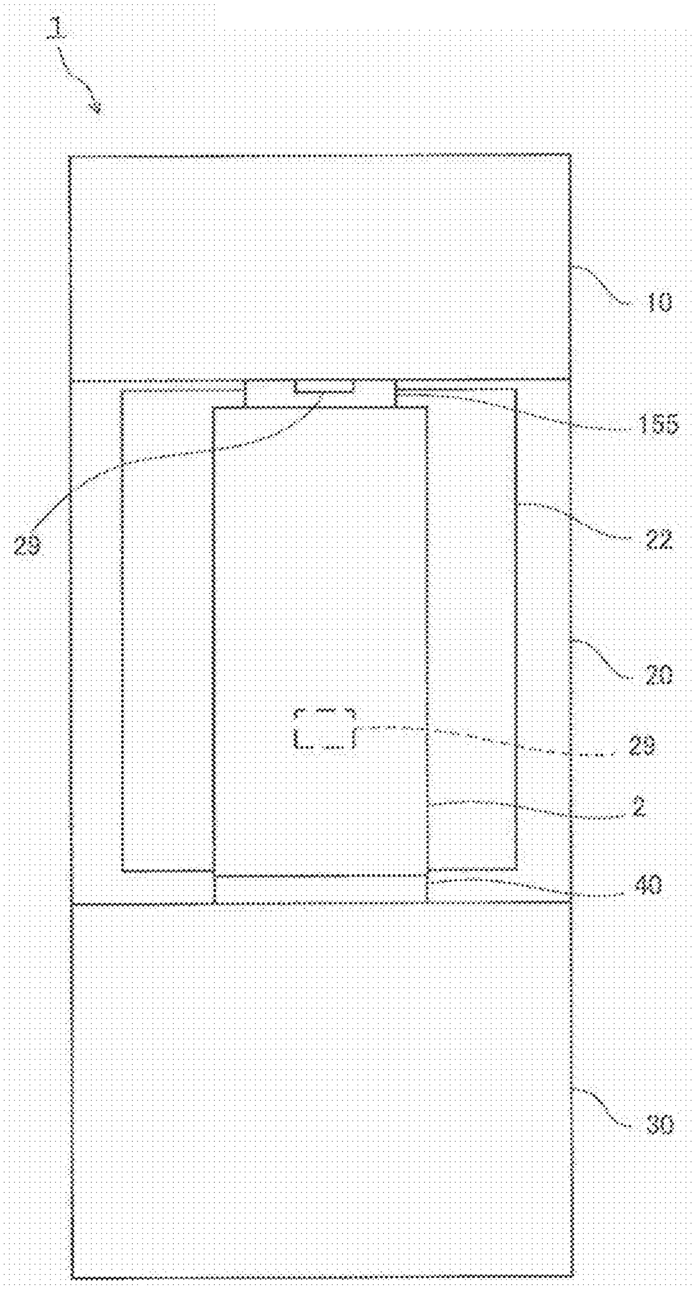
FIG. 6 is a schematic back-side view of the sheet processing apparatus according to Embodiment 4 of the present invention.

FIGS. 5 and 6 illustrate the banknote processing apparatus 1 as a sheet processing apparatus according to Embodiment 4 of the present invention. FIG. 5 is a schematic right-side view of a back side of the banknote processing apparatus 1, and a left side is a front side of the banknote processing apparatus 1, and a right side is a back side of the banknote processing apparatus 1. Furthermore, FIG. 6 is a schematic back-side view of the banknote processing apparatus 1.

The banknote processing apparatus 1 according to the present embodiment has approximately the same structure as the banknote processing apparatus 1 according to Embodiment 1 illustrated in FIG. 1, but is different from the banknote processing apparatus 1 according to Embodiment 1 mainly in the following two aspects.

One such aspect is that, with the banknote processing apparatus 1 according to the present embodiment, the attachment unit 40 is configured such that the container 2 may be directly mounted. Accordingly, with the banknote processing apparatus 1 according to the present embodiment, the container 2 may be directly mounted to the attachment unit 40 without using an attachment tool.

The other such aspect is that the banknote processing apparatus 1 according to the present embodiment includes a lock mechanism 28, and an operation unit 29 that is used in an operation of unlocking the lock mechanism 28. The lock mechanism 28 is a mechanism that prevents, in a locked state, the processing unit 10 from being pulled out forward from the storage chamber 20, or in other words, the transport unit 15 from moving in a horizontal direction with respect to each storage such as the second storage unit 25 and the like in the storage chamber 20. For example, the lock mechanism 28 is a lock that is mechanically connected with the operation unit 29, and the operation unit 29 is a key insertion unit that includes a keyhole where a key for operating the lock is inserted. Alternatively, the lock mechanism 28 is an electronic lock that is electronically connected with the operation unit 29, and the operation unit 29 is an input unit for inputting information such as a password or biological information for unlocking the electronic lock.

Accordingly, with the banknote processing apparatus 1 according to the present embodiment, by placing the lock mechanism 28 in the locked state, the processing unit 10 and the storage chamber 20 may be prevented from moving relative to each other during processing of banknotes. Therefore, for example, a person who is in front of the banknote processing apparatus 1 may be prevented from moving the processing unit 10 by mistake while banknote processing is being performed at the back of the banknote processing apparatus 1 using the container 2.

Moreover, an installation position of the operation unit 29 is desirably such a position at which the operation unit 29 is covered by the container 2 when the container 2 is mounted to the attachment unit 40. Such a position may be on a lower surface at a back side of the processing unit 10 or may be at a center of an outer surface of the door 22 at the back, as illustrated in FIGS. 5 and 6, for example. If the operation unit 29 is positioned at such a position, the operation unit 29 cannot be operated while the container 2 is mounted to the attachment unit 40. Accordingly, the locked state of the lock mechanism 28 may be prevented from being released by operation of the operation unit 29 while banknotes are being processed using the container 2. Additionally, in FIGS. 5 and 6, two operation units 29 are illustrated, but the number of operation units 29 provided at the banknote processing apparatus 1 may, of course, be one.

(5) Embodiment 5

Figure 7:
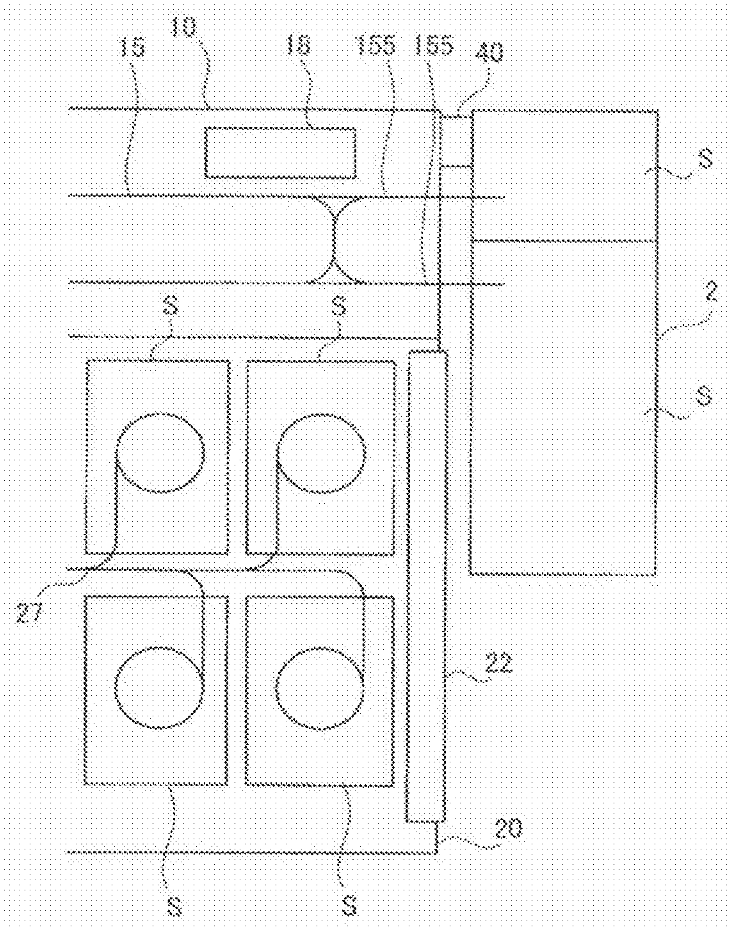
FIG. 7 is a schematic right-side view of a back side of a sheet processing apparatus according to Embodiment 5 of the present invention.

FIG. 7 illustrates the banknote processing apparatus 1 as a sheet processing apparatus according to Embodiment 5 of the present invention. FIG. 7 is a schematic right-side view of a back side of the banknote processing apparatus 1, and a left side is a front side of the banknote processing apparatus 1, and a right side is a back side of the banknote processing apparatus 1.

The banknote processing apparatus 1 according to the present embodiment has approximately the same structure as the banknote processing apparatus 1 according to Embodiment 3 illustrated in FIG. 4, but is different from the banknote processing apparatus 1 according to Embodiment 3 mainly in the following two aspects.

One such aspect is that the transport unit 15 of the banknote processing apparatus 1 according to the present embodiment includes, at the back, two fifth diversion paths 155 that are connected to the storage spaces S inside the container 2. The other such aspect is that the attachment unit 40 is provided on an outer surface on the back side of the banknote processing apparatus 1.

Accordingly, the banknote processing apparatus 1 according to the present embodiment may process banknotes in a state where the container 2 including two storage spaces S, as illustrated in FIG. 7, is mounted.

By allocating banknotes of different denominations to the two storage spaces S, replenishment of two types of banknotes may be performed at once at the time of a replenishing process, and two types of banknotes may be separately collected at once at the time of a collection process. For example, collected normal banknotes and collected counterfeit or suspect notes may be separately collected in the two storage spaces S.

Furthermore, banknotes for replenishment may be stored in one storage space S, and rejected banknotes occurring at the time of a replenishing process may be stored in the other storage space S. In this case, even if a space for storing rejected banknotes occurring at the time of a replenishing process (that is, the second rejected banknotes) is not provided inside the banknote processing apparatus 1, replenishment of banknotes may be performed from the container 2 with no problem. Moreover, in this case, once the replenishing process is started, the second rejected banknotes may be stored inside the container 2 without requiring a worker to have to wait around the banknote processing apparatus 1. This allows the worker to move to the next work location immediately after the replenishing process is started, and work efficiency may be increased. Moreover, it is possible not to return to the back side of the banknote processing apparatus 1 in a state where the container 2 is mounted to the banknote processing apparatus 1, until banknote processing is to be performed next using the container 2. This may further increase the work efficiency. In such a case, the container 2 is desirably lockable, and a key or unlocking information is desirably required at the time of removal from the banknote processing apparatus 1 and at the time of opening.

Figure 8:
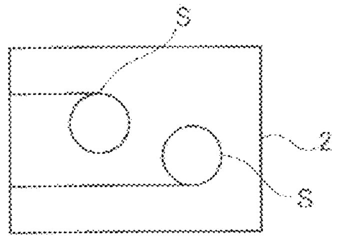
FIG. 8 is a schematic view illustrating an example of the container.

Additionally, the two storage spaces S provided in the container 2 are stacking storage spaces where a plurality of sheets are stored in a stacked state or winding storage spaces where a plurality of sheets are stored in a state of being wound around a rotary body. For example, by making the two storage spaces S both winding storage spaces, as illustrated in FIG. 8, the container 2 including the two storage spaces S may be made compact.

Embodiments of the present invention have been described above, but the present invention is not limited to the embodiments described above, and various modifications may be made within the scope of the present invention. For example, the processing unit 10 of an embodiment may be combined with the storage chamber 20 of another embodiment as a matter of course. Moreover, the sheet processing apparatus is not limited to the banknote processing apparatus, and may be an apparatus that processes sheets including paper or resin sheets such as checks and vouchers, for example.

(1) Reference Embodiment 1

Figure 9:
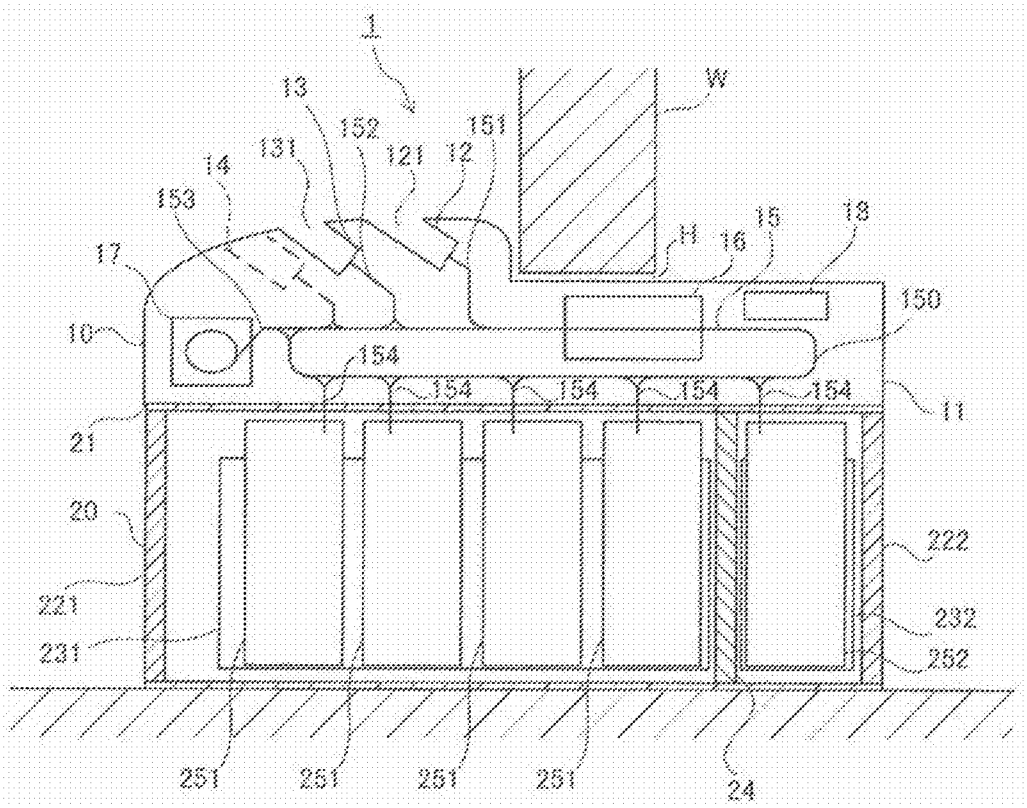
FIG. 9 is a schematic right-side view of a sheet processing apparatus according to Reference Embodiment 1.
Figure 10:
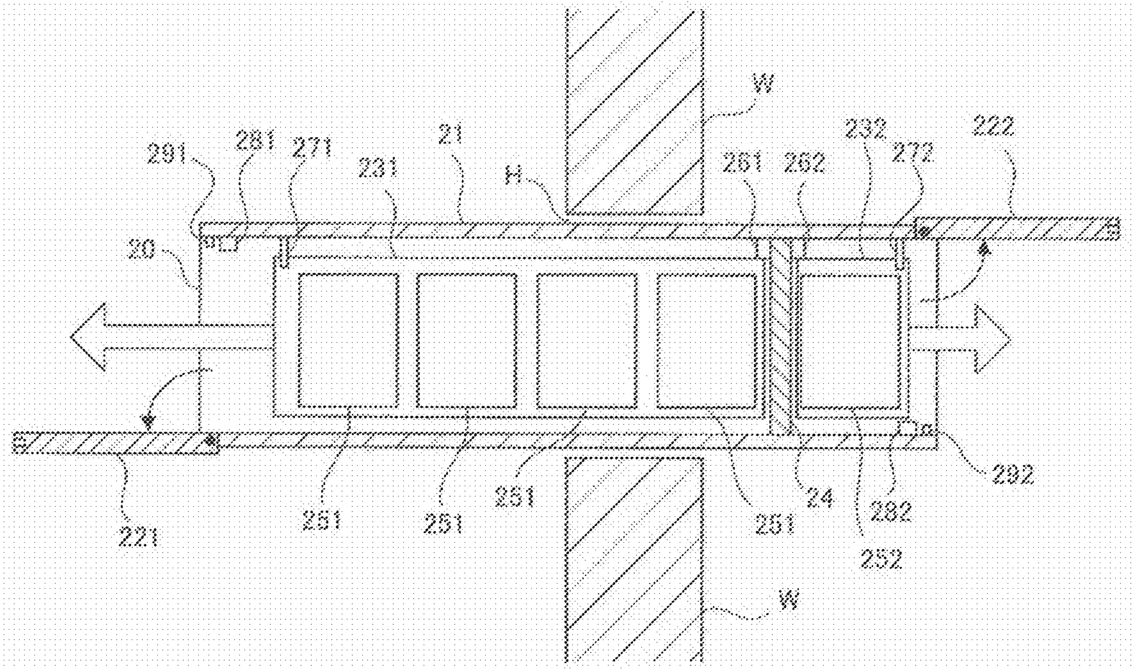
FIG. 10 is a schematic plan view of the sheet processing apparatus according to Reference Embodiment 1.

FIG. 9 illustrates a schematic right-side view of a banknote processing apparatus 1 as a sheet processing apparatus according to Reference Embodiment 1 of the present invention. Furthermore, FIG. 10 illustrates a schematic plan view of a storage chamber 20 constituting the banknote processing apparatus 1. In FIGS. 9 and 10, a left side is a front side of the banknote processing apparatus 1, and a right side is a back side of the banknote processing apparatus 1. Additionally, FIG. 9 illustrates a state where a first door 221 and a second door 222, described later, are closed, and FIG. 10 illustrates a state where the first door 221 and the second door 222 are opened.

The banknote processing apparatus 1 is a banknote depositing and dispensing machine where banknotes as sheets are deposited and dispensed. The banknote processing apparatus 1 includes a processing unit 10 and the storage chamber 20 provided below the processing unit 10.

The processing unit 10 is covered by an upper housing 11. An inlet (opening) 121 and an outlet (opening) 131 are provided at a front of the upper housing 11, that is, at a front of the processing unit 10. A transport unit 15, a recognition unit 16, a temporary storage unit 17, and a control unit 18 are disposed inside the upper housing 11, that is, inside the processing unit 10.

A banknote feeding mechanism (not illustrated) for feeding out banknotes to the transport unit 15 one by one in a predetermined cycle is disposed near the inlet 121. The inlet 121 and the banknote feeding mechanism configure a depositing unit 12.

A stacking mechanism (not illustrated) for stacking banknotes is disposed near the outlet 131. The outlet 131 and the stacking mechanism configure a dispensing unit 13. A second dispensing unit 14 having a similar structure as the dispensing unit 13 may be provided next to the dispensing unit 13 as necessary.

Additionally, it is also possible to provide only one of the depositing unit 12 or the dispensing unit 13 at the front of the processing unit 10 as necessary. Moreover, a depositing and dispensing unit may be provided by providing an opening for performing both depositing and dispensing of banknotes and by disposing the banknote feeding mechanism and the stacking mechanism around the opening.

The transport unit 15 transports banknotes at a predetermined transport speed. The transport unit 15 is configured by a belt mechanism and a roller mechanism for transporting banknotes. The transport unit 15 includes a loop transport path 150 enabling bi-directional transport of banknotes, and a first diversion path 151, a second diversion path 152, a third diversion path 153, and fourth diversion paths 154 diverged from the loop transport path 150. The first diversion path 151 to the fourth diversion paths 154 connect the loop transport path 150 to, respectively, the depositing unit 12, the dispensing unit 13, the temporary storage unit 17, and first storages 251 and a second storage 252 described later.

The recognition unit 16 includes a sensor such as an image sensor, an optical sensor, or a magnetic sensor, and recognizes authenticity, denomination, fitness and the like of banknotes transported by the transport unit 15.

The temporary storage unit 17 temporarily stores banknotes. The temporary storage unit 17 takes in and stores banknotes one by one, and feeds out stored banknotes one by one. For example, the temporary storage unit 17 can be configured by a winding storage where a plurality of sheets are stored in a state of being wound around a rotary body. Furthermore, the temporary storage unit 17 may be configured by a stacking storage where a plurality of sheets are stored in a stacked state.

The control unit 18 includes at least a CPU and a memory. The control unit 18 controls each unit configuring the banknote processing apparatus 1 such that banknotes are transported, via the transport unit 15, among the depositing unit 12, the dispensing unit 13, the temporary storage unit 17, the first storages 251, and the second storage 252.

The storage chamber 20 can be configured by a safe, for example. The storage chamber 20 forms a lower housing 21 including an opening at a front and a back. Furthermore, the storage chamber 20 includes a lockable first door 221 that opens and closes the opening at the front of the lower housing 21, and a lockable second door 222 that opens and closes the opening at the back of the lower housing 21. A key for unlocking the first door 221 or information to be input to unlock the first door 221 is different from a key for unlocking the second door 222 or information to be input to unlock the second door 222.

A first storage unit 231 that can be pulled out in a horizontal direction from the opening at the front, and a second storage unit 232 that can be pulled out in the horizontal direction from the opening at the back are disposed inside the lower housing 21. Additionally, a partition wall 24 indicated by a hatched line in FIG. 9 may be provided between the first storage unit 231 and the second storage unit 232. In this case, the partition wall 24 extends in a vertical direction.

The first storages 251, which are type-based storages where banknotes are stored type by type, are disposed inside the first storage unit 231, and the second storage 252, which is a storage for collection where banknotes to be collected are stored, is disposed inside the second storage unit 232. Additionally, the type-based storages may be disposed inside both the first storage unit 231 and the second storage unit 232, or the storage for collection may be disposed inside both the first storage unit 231 and the second storage unit 232. Additionally, in the case where a plurality of storages for collection are disposed, a person to collect the banknotes from one storage for collection and a person to collect the banknotes from the other storage for collection may be made different (for example, a bank and a security transportation service).

The first storages 251 and the second storage 252 are each connected to the transport unit 15 through the fourth diversion path 154.

The first storages 251 and the second storage 252 are each a storage including a stacking storage space where a plurality of sheets are stored in a stacked state or a winding storage space where a plurality of sheets are stored in a state of being wound around a rotary body. Additionally, the storage that is used as the storage for collection may be a storage bag or a storage box without a driving part.

With the banknote processing apparatus 1 according to the present reference embodiment, the second storage 252 is pulled outside the storage chamber 20 by opening the second door 222 provided at the back of the storage chamber 20 and pulling out the second storage unit 232 rearward as indicated by an arrow in FIG. 10. Accordingly, even if there are an operating person operating the depositing unit 12 or the dispensing unit 13 and a large number of unspecified people in front of the banknote processing apparatus 1, work of collecting banknotes may be performed at the back of the banknote processing apparatus 1 without being obstructed by such people.

Furthermore, conventionally, in a case where a storage unit or a storage is pulled out from a banknote processing apparatus during operation of the banknote processing apparatus (for example, during transport of banknotes), control is performed to forcibly interrupt operation of the banknote processing apparatus. Moreover, control is performed to prohibit operation of the banknote processing apparatus in a state where the storage unit or the storage is pulled out. Such control interferes with work of an operating person, such as staff of a bank, performing an operation by a depositing unit or a dispensing unit. Moreover, there are problems that if work of pulling out the storage unit or the storage, such as collecting work by a worker at a security transportation service, is prioritized, a wait time occurs for the operating person mentioned above, and if an operation by the operating person is prioritized, a wait time occurs for the worker mentioned above.

In contrast, with the banknote processing apparatus 1 according to the present reference embodiment, even if the second storage unit 232 is pulled out rearward as indicated by the arrow in FIG. 10 during operation of the banknote processing apparatus 1, certain processes may be continued without being interrupted. As such processes, a partial deposit process, the dispensing process and the reconciliation process that do not use the second storage 252 may be cited, for example. Moreover, these processes may be started while the second storage unit 232 is pulled out.

Moreover, conventionally, in the case where a banknote processing apparatus is installed in a security area in a bank, for example, staff of the bank has to be present at the time of banknote collecting work by a worker at a security transportation service or the like. This is burdensome for the staff, and also, there is a problem that a wait time occurs for the security transportation service side when the staff is busy. There is also a problem that, because the security transportation service sometimes bills for cost of services according to the time taken for the banknote collecting work, a cost is increased by the cost of services if a worker at the security transportation service is made to wait.

The banknote processing apparatus 1 according to the present reference embodiment may be installed by being inserted halfway into a through hole H provided in a wall W, as illustrated in FIGS. 9 and 10. In this case, if the back side of the banknote processing apparatus 1 is disposed in a closed area (such as a service corridor or a private room for security transportation services), a worker may open the second door 222 and perform work of collecting the banknotes without requiring the staff of the bank to be present.

Moreover, the banknote processing apparatus 1 according to the present reference embodiment includes the first door 221 at the front, in addition to the second door 222 at the back. Accordingly, even if an error occurs when the banknote processing apparatus 1 is being operated at the front, such a situation may be handled without having to move to the back of the banknote processing apparatus 1, or in other words, to the other side of the wall W. Work of resetting the error may be swiftly performed by opening the first door 221 provided at the front of the banknote processing apparatus 1 and pulling out the first storage unit 231 forward in a manner indicated by an arrow in FIG. 10.

Furthermore, a key for unlocking the first door 221 or information to be input to unlock the first door 221 is different from a key for unlocking the second door 222 or information to be input to unlock the second door 222. Accordingly, a person who is authorized only to unlock the first door 221 may be prevented from accessing the second storage 252, and a person who is authorized only to unlock the second door 222 may be prevented from accessing the first storages 251. For example, a person who is authorized only to unlock the first door 221 is staff of a facility, such as a bank, where the banknote processing apparatus 1 is installed, and a person who is authorized only to unlock the second door 222 is a worker at a security transportation service.

With the banknote processing apparatus 1 according to the present reference embodiment, inside of the lower housing 21, which is a space where the first storages 251 and the second storage 252 are disposed, may be divided into two by the partition wall 24. In this case, the second storage unit 232 side cannot be accessed through the opening at the front, and the first storage unit 231 side cannot be accessed through the opening at the back. Accordingly, situations may be reliably prevented where a person who is authorized only to unlock the first door 221 accesses the second storage 252, and where a person who is authorized only to unlock the second door 222 accesses the first storages 251.

Additionally, with the banknote processing apparatus 1 according to the present reference embodiment, the processing unit 10 is disposed above and across the first storages 251 and the second storage 252. Accordingly, even when the first storages 251 and the second storage 252 are separated by providing the partition wall 24, banknotes may be transported by the transport unit 15 between the first storages 251 and the second storage 252.

Moreover, due to its structure, the banknote processing apparatus 1 according to the present reference embodiment does not allow all the storages (the first storages 251 and the second storage 252) to be pulled out from the storage chamber 20 in one direction. Accordingly, the banknote processing apparatus 1 may be prevented from being shifted or from falling over because of a weight balance of the banknote processing apparatus 1 being lost due to all the storages being pulled out from the storage chamber 20 in one direction. Furthermore, a space to be secured to pull out each storage may be made small, and the banknote processing apparatus 1 according to the present reference embodiment may be installed at a location where the banknote processing apparatus 1 would not be able to be installed if all the storages were to be pulled out from the storage chamber 20 in one direction. Moreover, with the banknote processing apparatus 1 according to the present reference embodiment, a maximum pull-out distance for pulling out each storage may be made small, and thus, even a storage that is installed at a deepest position may be easily accessed.

Moreover, as illustrated in FIG. 10, the storage chamber 20 may include a first storage unit sensor 261 that is capable of detecting whether the first storage unit 231 is pulled out or not. The storage chamber 20 may further include a second storage unit sensor 262 that is capable of detecting whether the second storage unit 232 is pulled out or not. These sensors may be contact sensors that contact the storage units and output signals when the storage units are disposed inside the lower housing 21, for example. Signals output from these sensors are input to the control unit 18.

Moreover, the storage chamber 20 may include a first storage unit lock mechanism 271 that prevents the first storage unit 231 from being pulled out when it is detected by the second storage unit sensor 262 that the second storage unit 232 is pulled out. Furthermore, the storage chamber 20 may include a second storage unit lock mechanism 272 that prevents the second storage unit 232 from being pulled out when it is detected by the first storage unit sensor 261 that the first storage unit 231 is pulled out. For example, these lock mechanisms are each a mechanism including a latch that protrudes or retracts from the lower housing 21 with respect to the respective storage units. These lock mechanisms are controlled by the control unit 18.

In the case where these sensors and lock mechanisms are provided, that the second storage unit 232 is not pulled out may be taken as one condition for allowing the first storage unit 231 to be pulled out. Furthermore, that the first storage unit 231 is not pulled out may be taken as one condition for allowing the second storage unit 232 to be pulled out. In this case, the first storage unit 231 (that is, the first storage 251) and the second storage unit 232 (that is, the second storage 252) may be prevented from being pulled out at the same time. Accordingly, the banknote processing apparatus 1 may be prevented from being shifted or from falling over because of a weight balance of the banknote processing apparatus 1 being lost due to a plurality of storage units (that is, the storages) being pulled out.

Moreover, as illustrated in FIG. 10, the storage chamber 20 may include a first door sensor 281 that is capable of detecting whether the first door 221 is open or not. Furthermore, the storage chamber 20 may include a second door sensor 282 that is capable of detecting whether the second door 222 is open or not. These sensors may be contact sensors that contact respective doors and output signals when the respective doors are closed, for example. Signals output from these sensors are input to the control unit 18.

Moreover, the storage chamber 20 may include a first door lock mechanism 291 that prevents the first door 221 from being opened when it is detected by the second door sensor 282 that the second door 222 is open. Furthermore, the storage chamber 20 may include a second door lock mechanism 292 that prevents the second door 222 from being opened when it is detected by the first door sensor 281 that the first door 221 is open. For example, these lock mechanisms are each a mechanism including a latch that protrudes or retracts from the lower housing 21 with respect to the respective doors. These lock mechanisms are controlled by the control unit 18.

In the case where these sensors and lock mechanisms are provided, that the first door 221 is not open may be taken as one condition for allowing opening of the second door 222. Furthermore, that the second door 222 is not open may be taken as one condition for allowing opening of the first door 221. In this case, the first door 221 and the second door 222 may be prevented from being opened at the same time. Accordingly, two types of work may be prevented from affecting each other due to one door being opened for work, such as resetting of an error, to be performed while work that is performed by opening the other door is being performed.

Additionally, the storage chamber 20 may also be configured by arranging two safes, each including one door, next to each other back to back. In this case, the partition wall is a double partition wall formed from back-side walls of the safes.

(2) Reference Embodiment 2

Figure 11:
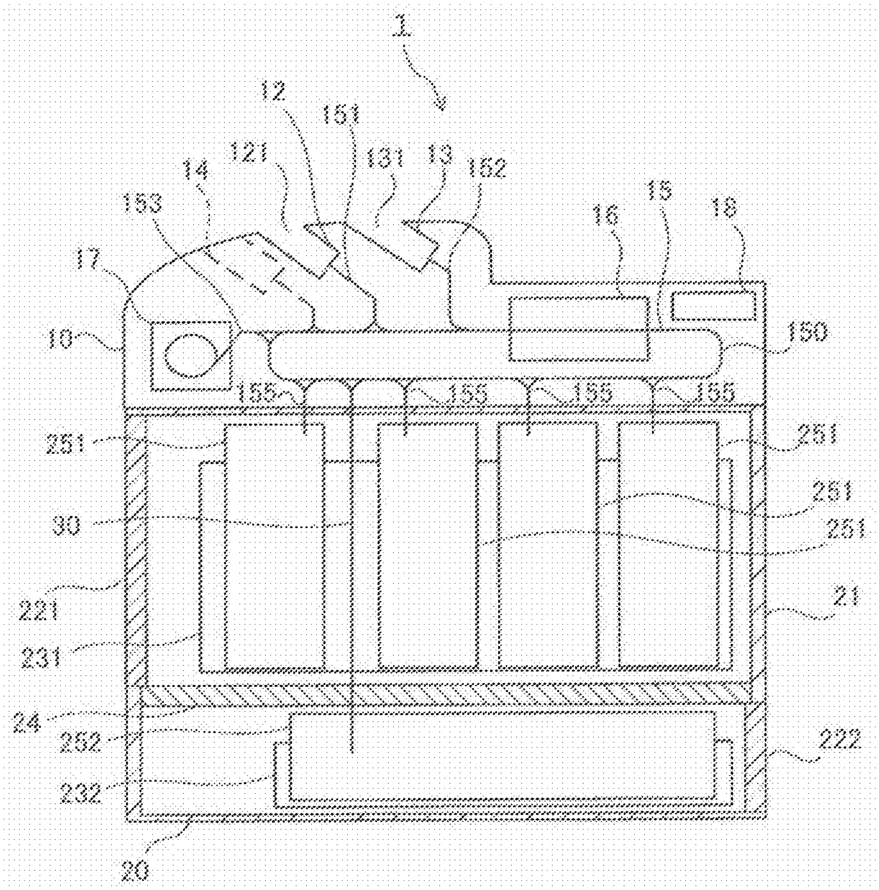
FIG. 11 is a schematic right-side view of a sheet processing apparatus according to Reference Embodiment 2.

FIG. 11 illustrates a schematic right-side view of the banknote processing apparatus 1 as a sheet processing apparatus according to Reference Embodiment 2 of the present invention. In FIG. 11, a left side is a front side of the banknote processing apparatus 1, and a right side is a back side of the banknote processing apparatus 1. In the following, differences to the banknote processing apparatus 1 according to the preceding reference embodiment will be mainly described.

When compared with the banknote processing apparatus 1 according to the preceding reference embodiment, the banknote processing apparatus 1 according to the present reference embodiment is different with respect to the structure of the storage chamber That is, with the storage chamber 20 of the banknote processing apparatus 1 according to the present reference embodiment, the first storages 251, which are type-based storages, are disposed on an upper side in the lower housing 21, and the second storage 252, which is a storage for collection, is disposed on a lower side in the lower housing 21. Additionally, the type-based storages may be disposed on both the upper side and the lower side in the lower housing 21, or the storage for collection may be disposed on both the upper side and the lower side in the lower housing 21. Additionally, in the case where a plurality of storages for collection are disposed, a person to collect the banknotes from one storage for collection and a person to collect the banknotes from the other storage for collection may be made different (for example, a bank and a security transportation service).

Specifically, the storage chamber 20 forms the lower housing 21 including an opening at an upper front part and a lower back part. Furthermore, the storage chamber 20 includes the lockable first door 221 that opens and closes the opening at the upper front part of the lower housing 21, and the lockable second door 222 that opens and closes the opening at the lower back part of the lower housing 21. A key for unlocking the first door 221 or information to be input to unlock the first door 221 is different from a key for unlocking the second door 222 or information to be input to unlock the second door 222. Additionally, the structure of the storage chamber 20 is not limited to such a structure. For example, the lower housing 21 may include an opening at a lower front part and an upper back part, and the first door 221 and the second door 222 may open and close respective openings.

The first storage unit 231 that can be pulled out horizontally forward from the opening at the upper front part, and the second storage unit 232 that can be pulled out horizontally rearward from the opening at the lower back part are disposed inside the lower housing 21. Additionally, the partition wall 24 indicated by a hatched line in FIG. 11 may be provided between the first storage unit 231 and the second storage unit 232. In this case, the partition wall 24 extends in the horizontal direction.

The first storages 251 are disposed inside the first storage unit 231. The first storages 251 are each connected to the transport unit 15 through the fourth diversion path 154. Furthermore, the second storage 252 is disposed inside the second storage unit 232. The second storage 252 is connected to the transport unit 15 through the fourth diversion path 154. Furthermore, the storage chamber 20 includes a vertical transport path 30. The vertical transport path 30 penetrates the first storage unit 231 in a vertical direction, and also, connects the second storage 252 and the transport unit 15 via the fourth diversion path 154. The vertical transport path 30 may be moved in the horizontal direction together with the first storage unit 231.

The first storage 251 is a storage including a stacking storage space where a plurality of sheets are stored in a state of being stacked in an up-down direction or in a front-back direction of the banknote processing apparatus 1, or a winding storage space where a plurality of sheets are stored in a state of being wound around a rotary body. Moreover, the second storage 252 is a storage having a narrow shape that extends in the front-back direction of the banknote processing apparatus 1. Inside the second storage 252, a plurality of sheets are stored being stacked in the front-back direction of the banknote processing apparatus 1 or in the up-down direction.

With the banknote processing apparatus 1 according to the present reference embodiment, the second storage 252 is pulled outside the storage chamber 20 by opening the second door 222 provided at the back of the storage chamber 20 and pulling out the second storage unit 232 rearward. Accordingly, the banknote processing apparatus 1 according to the present reference embodiment may also achieve advantageous effects similar to those of the banknote processing apparatus 1 according to the preceding reference embodiment. For example, even if there are an operating person operating the depositing unit 12 or the dispensing unit 13 and a large number of unspecified people in front of the banknote processing apparatus 1, work of collecting banknotes may be performed at the back of the banknote processing apparatus 1 without being obstructed by such people. Furthermore, even if the second storage 252 is pulled out while a process that does not use the second storage 252, such as a partial deposit process, the dispensing process, or the reconciliation process, is being performed, such a process may be continued. Moreover, such a process may be started even in a state where the second storage 252 is pulled out.

Moreover, also with the banknote processing apparatus 1 according to the present reference embodiment, as with the banknote processing apparatus 1 according to the preceding reference embodiment, the first storage unit sensor 261, the second storage unit sensor 262, and the second storage unit lock mechanism 272 may be provided at the storage chamber 20. Furthermore, also with the banknote processing apparatus 1 according to the present reference embodiment, as with the banknote processing apparatus 1 according to the preceding reference embodiment, the first door sensor 281, the second door sensor 282, the second door lock mechanism 292, and the first door lock mechanism 291 may be provided at the storage chamber 20.

Additionally, the storage chamber 20 may also be configured by vertically stacking two safes, each including one door, with the doors facing opposite directions. In this case, the partition wall is a double partition wall configured by a bottom wall of the safe on the upper side and a ceiling wall of the safe on the lower side.

(3) Reference Embodiment 3

Figure 12:
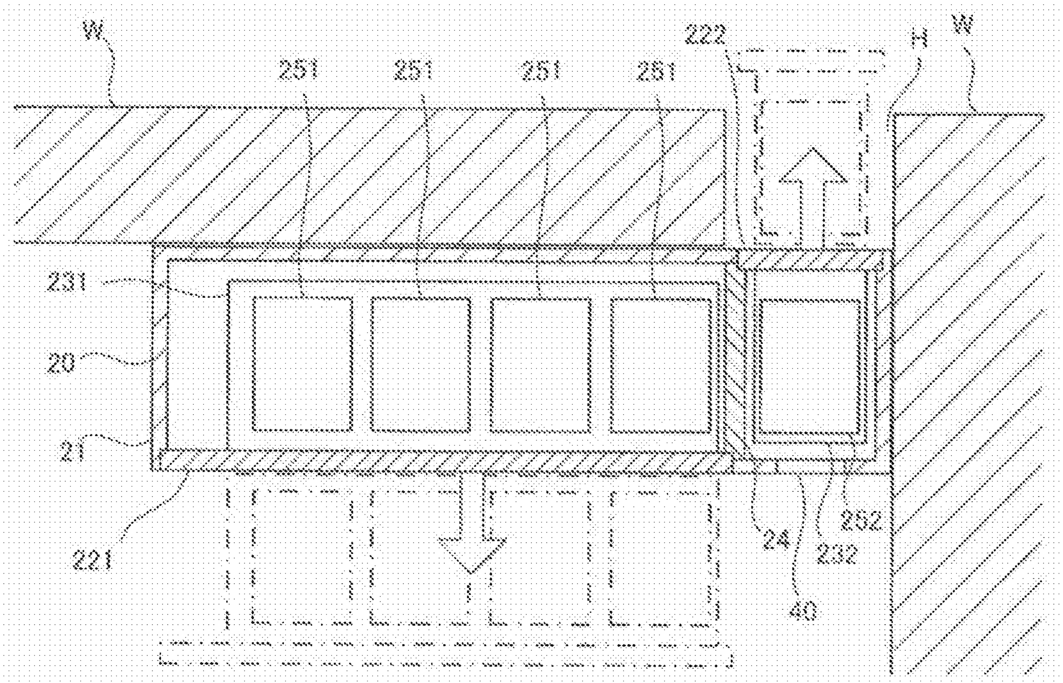
FIG. 12 is a schematic plan view of a sheet processing apparatus according to Reference Embodiment 3.

FIG. 12 illustrates a schematic plan view of the storage chamber 20 constituting the banknote processing apparatus 1 as a sheet processing apparatus according to Reference Embodiment 3 of the present invention. In FIG. 12, a left side is a front side of the banknote processing apparatus 1, and a right side is a back side of the banknote processing apparatus 1. In the following, differences to the banknote processing apparatus 1 according to Reference Embodiment 1 will be mainly described.

When compared with the banknote processing apparatus 1 according to Reference Embodiment 1, the banknote processing apparatus 1 according to the present reference embodiment is different with respect to the structure of the storage chamber 20. That is, the storage chamber 20 of the banknote processing apparatus 1 according to the present reference embodiment is configured such that storages are pulled out from both left and right sides.

Specifically, the storage chamber 20 forms the lower housing 21 including an opening on a front right side and a back left side. Furthermore, the storage chamber 20 includes the lockable first door 221 that opens and closes the opening on the front right side, and the lockable second door 222 that opens and closes the opening on the back left side. A key for unlocking the first door 221 or information to be input to unlock the first door 221 is different from a key for unlocking the second door 222 or information to be input to unlock the second door 222.

Furthermore, the first storage unit 231 disposed inside the lower housing 21 is coupled with the first door 221. The first door 221 and the first storage unit 231 are configured in a manner capable of being horizontally pulled out, while being integrated, to the right side from the opening on the front right side of the lower housing 21.

Furthermore, the second storage unit 232 disposed inside the lower housing 21 is coupled with the second door 222. The second door 222 and the second storage unit 232 are configured in a manner capable of being horizontally pulled out, while being integrated, to the left side from the opening on the back left side of the lower housing 21.

Additionally, the partition wall 24 indicated by a hatched line in FIG. 12 may be provided at a position between the first storage unit 231 and the second storage unit 232 inside the lower housing 21. In this case, the partition wall 24 extends in the vertical direction.

The first storages 251, which are type-based storages where banknotes are stored type by type, are disposed inside the first storage unit 231, and the second storage 252, which is a storage for collection where banknotes to be collected are stored, is disposed inside the second storage unit 232. Additionally, the type-based storages may be disposed inside both the first storage unit 231 and the second storage unit 232, or the storage for collection may be disposed inside both the first storage unit 231 and the second storage unit 232. Additionally, in the case where a plurality of storages for collection are disposed, a person to collect the banknotes from one storage for collection and a person to collect the banknotes from the other storage for collection may be made different (for example, a bank and a security transportation service).

The first storages 251 and the second storage 252 are each connected to the transport unit 15 through the fourth diversion path 154 (see FIG. 9).

Moreover, a window 40 allowing the inside of the lower housing 21 to be viewed is provided on the back right side of the lower housing 21.

With the banknote processing apparatus 1 according to the present reference embodiment, the second storage 252 is pulled outside the storage chamber 20 by pulling out the second door 222 provided on the back left side of the storage chamber 20 to the left side together with the second storage unit 232 in the manner indicated by an arrow in FIG. 12. Accordingly, the banknote processing apparatus 1 according to the present reference embodiment may also achieve advantageous effects similar to those of the banknote processing apparatus 1 according to Reference Embodiment 1. For example, even if there are an operating person operating the depositing unit 12 or the dispensing unit 13 and a large number of unspecified people in front of the banknote processing apparatus 1, work of collecting banknotes may be performed at the back of the banknote processing apparatus 1 without being obstructed by such people. Furthermore, even if the second storage 252 is pulled out while a process that does not use the second storage 252, such as a partial deposit process, the dispensing process, or the reconciliation process, is being performed, such a process may be continued. Moreover, such a process may be started even in a state where the second storage 252 is pulled out.

Moreover, with the banknote processing apparatus 1 according to the present reference embodiment, the first storages 251 are pulled outside the storage chamber 20 by pulling out the first door 221 provided on the front right side of the storage chamber 20 to the right side together with the first storage unit 231 in the manner indicated by an arrow in FIG. 12. Accordingly, the banknote processing apparatus 1 according to the present reference embodiment may be installed at a location where an enough space to pull out the first storage unit 231 or the second storage unit 232 to the front or the back of the banknote processing apparatus 1 cannot be secured.

For example, as illustrated in FIG. 12, if a through hole H is provided at a corner formed by two walls W, the banknote processing apparatus 1 may be disposed along the two walls W forming the corner by adjusting the position of the second door 222 to match the through hole H.

In this case, a space where the second storage 252 is pulled out and a space where the banknote processing apparatus 1 is installed are separated by the walls W. Accordingly, even if there are an operating person operating the depositing unit 12 or the dispensing unit 13 and a large number of unspecified people in front of the banknote processing apparatus 1, work of pulling out the second storage 252 may be performed in a separate space without being obstructed by such people.

Moreover, the banknote processing apparatus 1 according to the present reference embodiment includes the window 40, and thus, a person on the right side of the banknote processing apparatus 1 may swiftly view and check the state of the second storage 252 through the window 40 without opening the second door 222. For example, in the case where the second storage 252 is a storage bag, the approximate amount of banknotes that are stored in the second storage 252 may be checked. Furthermore, whether or not the second storage 252 is appropriately mounted may be checked. Additionally, an attachment position of the window 40 is, of course, not limited to the right side of the banknote processing apparatus 1, and may be at the back or at the top according to the installation position of the banknote processing apparatus 1.

Moreover, also with the banknote processing apparatus 1 according to the present reference embodiment, as with the banknote processing apparatus 1 according to Reference Embodiment 1 illustrated in FIG. 10, the storage chamber 20 may include the first storage unit sensor 261, the second storage unit sensor 262, and the second storage unit lock mechanism 272 as a matter of course. Furthermore, also with the banknote processing apparatus 1 according to the present reference embodiment, as with the banknote processing apparatus 1 according to Reference Embodiment 1 illustrated in FIG. 10, the storage chamber may include the first door sensor 281, the second door sensor 282, the second door lock mechanism 292, and the first door lock mechanism 291 as a matter of course.

Additionally, the storage chamber 20 may also be configured by arranging two safes, each including one door, next to each other with right side surfaces or left side surfaces in contact with other. In this case, the partition wall is a double partition wall configured by side walls of the safes.

(4) Reference Embodiment 4

Figure 13:
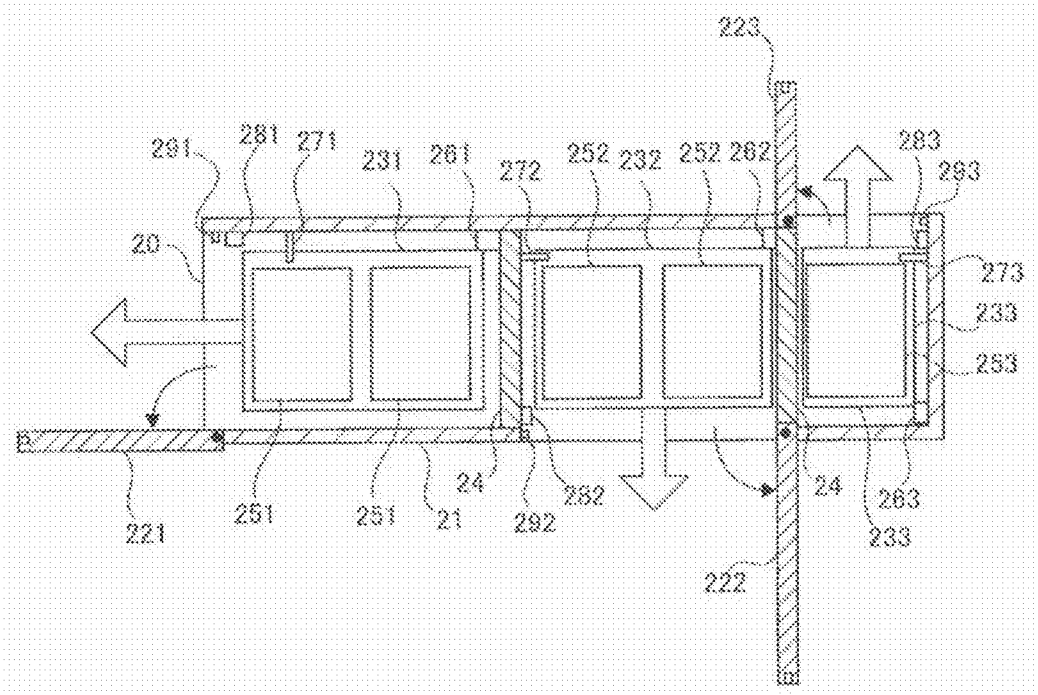
FIG. 13 is a schematic plan view of a sheet processing apparatus according to Reference Embodiment 4.

FIG. 13 illustrates a schematic plan view of the storage chamber 20 constituting the banknote processing apparatus 1 as a sheet processing apparatus according to Reference Embodiment 4 of the present invention. In FIG. 13, a left side is a front side of the banknote processing apparatus 1, and a right side is a back side of the banknote processing apparatus 1. In the following, differences to the banknote processing apparatus 1 according to Reference Embodiment 1 will be mainly described.

The storage chamber 20 of the banknote processing apparatus 1 according to the present reference embodiment is configured such that the storages may be pulled out in three directions of a forward direction, a right direction, and a left direction.

Specifically, the storage chamber 20 forms the lower housing 21 including an opening at a front, a center on a right side, and a back left side. Furthermore, the storage chamber 20 includes the lockable first door 221 that opens and closes the opening at the front, the lockable second door 222 that opens and closes the opening at the center on the right side, and a lockable third door 223 that opens and closes the opening at the back left side.

The first storage unit 231 that can be pulled out horizontally forward from the opening at the front, the second storage unit 232 that can be pulled out horizontally to the right from the opening at the center on the right side, and a third storage unit 233 that can be pulled out horizontally to the left from the opening at the back left side are disposed inside the lower housing 21. Additionally, the partition wall 24 indicated by a hatched line in FIG. 13 may be provided between the first storage unit 231 and the second storage unit 232, and between the second storage unit 232 and the third storage unit 233. In this case, each partition wall 24 extends in the vertical direction.

The first storages 251, which are type-based storages where banknotes are stored type by type, are disposed inside the first storage unit 231. Furthermore, second storages 252, which are type-based storages where banknotes are stored type by type, are disposed inside the second storage unit 232. Furthermore, a third storage 253, which is a storage for collection where banknotes to be collected are stored, is disposed inside the third storage unit 233. However, the storages to be disposed in respective storage units are not limited to the above, and may be changed as necessary. For example, the type-based storages may be disposed inside all the first storage unit 231, the second storage unit 232, and the third storage unit 233. Alternatively, the storage for collection may be disposed inside all the first storage unit 231, the second storage unit 232, and the third storage unit 233. Additionally, in the case where a plurality of storages for collection are disposed, a person to collect the banknotes from one storage for collection and a person to collect the banknotes from the other storage for collection may be made different (for example, a bank and a security transportation service).

The first storages 251, the second storages 252, and the third storage 253 are each connected to the transport unit 15 through the fourth diversion path 154 (see FIG. 9).

With the banknote processing apparatus 1 according to the present reference embodiment, the third storage 253 is pulled outside the storage chamber 20 by opening the third door 223 provided on the back left side of the storage chamber 20, and pulling out the third storage unit 233 to the left. Accordingly, with the banknote processing apparatus 1 according to the present reference embodiment, even if there are an operating person operating the depositing unit 12 or the dispensing unit 13 and a large number of unspecified people in front of the banknote processing apparatus 1, work of collecting banknotes may be performed at the back left side of the banknote processing apparatus 1 without being obstructed by such people. Furthermore, even if the second storage 252 or the third storage 253 is pulled out while a process that does not use the second storage 252 or the third storage 253, such as a partial deposit process, the dispensing process, or the reconciliation process, is being performed, such a process may be continued. Moreover, such a process may be started even in a state where the second storage 252 or the third storage 253 is pulled out.

Moreover, with the banknote processing apparatus 1 according to the present reference embodiment, a pull-out distance is short in both cases of pulling out the first storage 251 from the storage chamber 20 and of pulling out the second storage 252 from the storage chamber 20. Accordingly, installation is possible also at a location where a large space for pulling out the storages cannot be secured.

Furthermore, a key for unlocking the first door 221 or information to be input to unlock the first door 221 may be made different from a key for unlocking the second door 222 or information to be input to unlock the second door 222, and from a key for unlocking the third door 223 or information to be input to unlock the third door 223. This enables to allow only a specific person to access a specific storage. Accordingly, the banknote processing apparatus 1 may be more flexibly operated. Additionally, it is needless to say that the functions assigned to the three storages are not limited to those described above. For example, the first storages 251 and the third storage 253 may be made the type-based storages, and the second storages 252 may be made the storages for collection.

Moreover, also with the banknote processing apparatus 1 according to the present reference embodiment, as with the banknote processing apparatus 1 according to Reference Embodiment 1, the storage chamber 20 may include the first storage unit sensor 261, and the second storage unit sensor 262. Furthermore, the storage chamber 20 may include a third storage unit sensor 263 that is capable of detecting whether the third storage unit 233 is pulled out or not. These sensors may be contact sensors that contact respective storage units and output signals when the respective storage units are disposed inside the lower housing 21. Signals output from these sensors are input to the control unit 18.

Moreover, the storage chamber 20 may include the first storage unit lock mechanism 271 that prevents the first storage unit 231 from being pulled out when it is detected by the second storage unit sensor 262 or the third storage unit sensor 263 that the second storage unit 232 or the third storage unit 233 is pulled out. Furthermore, the storage chamber 20 may include the second storage unit lock mechanism 272 that prevents the second storage unit 232 from being pulled out when it is detected by the first storage unit sensor 261 or the third storage unit sensor 263 that the first storage unit 231 or the third storage unit 233 is pulled out. Still further, the storage chamber 20 may include a third storage unit lock mechanism 273 that prevents the third storage unit 233 from being pulled out when it is detected by the first storage unit sensor 261 or the second storage unit sensor 262 that the first storage unit 231 or the second storage unit 232 is pulled out. For example, these lock mechanisms are each a mechanism including a latch that protrudes or retracts from the lower housing 21 with respect to the respective storage units. These lock mechanisms are controlled by the control unit 18.

In the case where these sensors and lock mechanisms are provided, that at least one of the second storage unit 232 or the third storage unit 233 is not pulled out may be taken as one condition for allowing pulling out of the first storage unit 231. The same can be said with respect to conditions for allowing pulling out of the second storage unit 232 and the third storage unit 233. That is, other storage units may be prevented from being pulled out when a certain storage unit is pulled out. Accordingly, the banknote processing apparatus 1 may be prevented from being shifted or from falling over because of a weight balance of the banknote processing apparatus 1 being lost due to a plurality of storage units (that is, the storages) being pulled out at the same time.

Additionally, it is needless to say that the number of storage units that can be pulled out at the same time may be made one, two, or three according to needs.

Moreover, also with the banknote processing apparatus 1 according to the present reference embodiment, as with the banknote processing apparatus 1 according to Reference Embodiment 1, the storage chamber 20 may include the first door sensor 281, and the second door sensor 282. The storage chamber 20 may further include a third door sensor 283 that is capable of detecting whether the third door 223 is open or not. These sensors may be contact sensors that contact respective doors and output signals when the respective doors are closed, for example. Signals output from these sensors are input to the control unit 18.

The storage chamber 20 may further include the first door lock mechanism 291 that prevents the first door 221 from being opened when it is detected by the second door sensor 282 or the third door sensor 283 that the second door 222 or the third door 223 is open. Furthermore, the storage chamber 20 may include the second door lock mechanism 292 that prevents the second door 222 from being opened when it is detected by the first door sensor 281 or the third door sensor 283 that the first door 221 or the third door 223 is open. Still further, the storage chamber 20 may include a third door lock mechanism 293 that prevents the third door 223 from being opened when it is detected by the first door sensor 281 or the second door sensor 282 that the first door 221 or the second door 222 is open. For example, these lock mechanisms are each a mechanism including a latch that protrudes or retracts from the lower housing 21 with respect to the respective doors. These lock mechanisms are controlled by the control unit 18.

In the case where these sensors and lock mechanisms are provided, that at least one of the second door 222 or the third door 223 is not open may be taken as one condition for allowing opening of the first door 221. The same can be said with respect to conditions for allowing opening of the second door 222 and the third door 223. That is, other doors may be prevented from being opened when a certain door is open. Accordingly, two or more types of work may be prevented from affecting each other due to one door being opened for work, such as resetting of an error, to be performed while work that is performed by opening another door is being performed.

Additionally, it is needless to say that the number of doors openable at the same time may be made one, two, or three according to needs.

Additionally, the storage chamber 20 may also be configured by arranging three safes, each including one door, next to one another. In this case, two partition walls are each a double partition wall that is configured by side walls of the respective safes.

(5) Reference Embodiment 5

Figure 14:
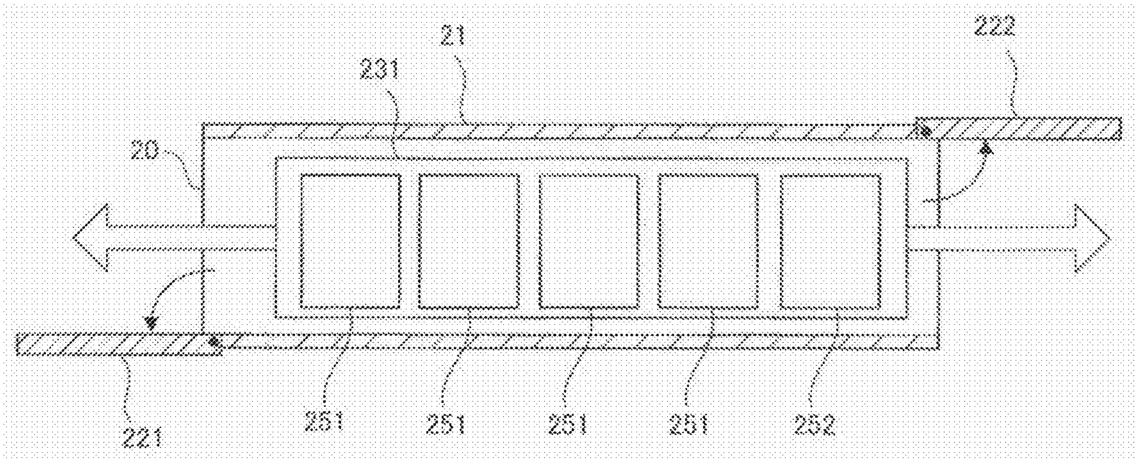
FIG. 14 is a schematic plan view of a sheet processing apparatus according to Reference Embodiment 5.

FIG. 14 illustrates a schematic plan view of the storage chamber 20 constituting the banknote processing apparatus 1 as a sheet processing apparatus according to Reference Embodiment 5 of the present invention. In FIG. 14, a left side is a front side of the banknote processing apparatus 1, and a right side is a back side of the banknote processing apparatus 1. In the following, differences to the banknote processing apparatus 1 according to Reference Embodiment 1 will be mainly described.

When compared with the banknote processing apparatus 1 according to Reference Embodiment 1, the banknote processing apparatus 1 according to the present reference embodiment is different with respect to the structure of the storage chamber 20. That is, the storage chamber 20 of the banknote processing apparatus 1 according to the present reference embodiment includes the first storage unit 231 as a single storage unit, and the first storages 251 and the second storage 252 are disposed inside the first storage unit 231. Accordingly, all the storages may be pulled out in any of forward and rearward directions.

Accordingly, with the banknote processing apparatus 1 according to the present reference embodiment, the second storage 252 where banknotes to be collected are stored is pulled outside the storage chamber 20 by opening the second door 222 provided at the back of the storage chamber 20 and pulling out the first storage unit 231 rearward. Accordingly, even if there are an operating person operating the depositing unit 12 or the dispensing unit 13 and a large number of unspecified people in front of the banknote processing apparatus 1, work of collecting banknotes may be performed at the back of the banknote processing apparatus 1 without being obstructed by such people. On the other hand, in the case where there is no such concern, the work of collecting banknotes and maintenance work may be performed at the front of the banknote processing apparatus 1 by pulling out the first storage unit 231 forward.

Reference embodiments of the present invention have been described above, but the reference embodiments of the present invention are not limited to the embodiments described above, and various modifications may be made within the scope of the reference embodiments of the present invention. For example, the directions of pulling out the storage units (storages) from the storage chamber are not limited to the forward, rearward, right and left directions of the banknote processing apparatus. That is, the storage units may be pulled out upward from the banknote processing apparatus, or may be pulled out downward by installing the banknote processing apparatus on a floor having a through hole.

Moreover, the sheet processing apparatus is not limited to the banknote processing apparatus, and may be an apparatus that processes sheets including paper or resin sheets such as checks and vouchers, for example.

The disclosures of Japanese Patent Application Nos. 2017-049799 and 2017-049793, both filed on Mar. 15, 2017, including the specifications, drawings and abstracts, are incorporated herein by reference in its entirety.

INDUSTRIAL APPLICABILITY

The present invention is capable of improving operability of a sheet processing apparatus that stores sheets type by type, by being applied to the sheet processing apparatus, and therefore has a great industrial applicability.

REFERENCE SIGNS LIST

1 Banknote processing apparatus
10 Processing unit
11 Upper housing
12 Depositing unit
121 Inlet (opening)
13 Dispensing unit
131 Outlet (opening)
14 Second dispensing unit
15 Transport unit
150 Loop transport path
151 First diversion path
152 Second diversion path
153 Third diversion path
154 Fourth diversion path
155 Fifth diversion path
156 Sixth diversion path
16 Recognition unit
17 Temporary storage unit
18 Control unit
19 Storage unit dedicated to rejected banknotes
20 Storage chamber
21 Lower housing
22 Door
23 Multipurpose storage unit
24 First storage unit, partition wall
25 Second storage unit
26 Vertical transport path
27 Bent transport path
28 Lock mechanism
29 Operation unit
30 Second storage chamber, vertical transport path
31 Bottom housing
32 Second door
33 Collection unit
40 Attachment unit, window
41 Second attachment unit
50 Cover
2 Container to be mounted detachably
3 Attachment tool
4 Second container to be mounted detachably
5 Second attachment tool
S Storage space
221 First door
222 Second door
223 Third door
231 First storage unit
232 Second storage unit
233 Third storage unit
251 First storage
252 Second storage
253 Third storage
261 First storage unit sensor
262 Second storage unit sensor
263 Third storage unit sensor
271 First storage unit lock mechanism
272 Second storage unit lock mechanism
273 Third storage unit lock mechanism
281 First door sensor
282 Second door sensor
283 Third door sensor
291 First door lock mechanism
292 Second door lock mechanism
293 Third door lock mechanism
W Wall
H Through hole

The invention claimed is:

1. A sheet processing apparatus, comprising:

a processing unit having an opening through which at least one of feeding a sheet in the apparatus or feeding the sheet out from the apparatus is performed;

a storage chamber having at least one of first storage which is configured to store the sheet fed in the apparatus;

an attachment unit which is provided at an outer surface of the processing unit or the storage chamber and to which a container for storing therein the sheet fed in the apparatus is capable of being mounted;

a transport mechanism configured to transport the sheet among the opening, the first storage, and the container; and a control unit configured to:

control the transport mechanism, perform a sheet processing using the container, control the transport mechanism such that the sheet is transported between the first storage and the container in the sheet processing using the container, and control the transport mechanism such that a rejected sheet occurring at the sheet processing using the container is transported to a second storage for storing a counterfeit banknote, wherein the counterfeit banknote occurring at a dispensing process of feeding the sheet stored in the first storage out to the opening is stored in the second storage.

2. The sheet processing apparatus according to claim 1, wherein the second storage is different from the first storage.

3. The sheet processing apparatus according to claim 1, wherein the second storage comprises a temporary storage.

4. The sheet processing apparatus according to claim 1, wherein the sheet processing using the container comprises a replenishing process of storing the sheet fed out from the container in the first storage.

5. The sheet processing apparatus according to claim 1, wherein the sheet processing using the container comprises a collection process of transporting the sheet stored in the first storage to the container for storage.

6. The sheet processing apparatus according to claim 1, wherein the sheet processing using the container comprises a reconciliation process of transporting the sheet stored in the first storage to the container for performing reconciliation of the sheet stored in the first storage.

7. A sheet processing apparatus, comprising:

a processing unit having an opening through which at least one of feeding a sheet in the apparatus or feeding the sheet out from the apparatus is performed;

a storage chamber having at least one of first storage which is configured to store the sheet fed in the apparatus;

an attachment unit which is provided at an outer surface of the processing unit or the storage chamber and to which a container for storing therein the sheet fed in the apparatus is capable of being mounted;

a transport mechanism configured to transport the sheet among the opening, the first storage, and the container; and a control unit configured to:

control the transport mechanism, perform a sheet processing using the container, control the transport mechanism such that the sheet is transported between the first storage and the container in the sheet processing using the container, and control the transport mechanism such that a rejected sheet occurring at the sheet processing using the container is transported to a second storage for storing a counterfeit banknote, wherein the container includes at least two storage spaces, and the second storage comprises a first storage space of the at least two storage spaces.

8. The sheet processing apparatus according to claim 7, wherein the counterfeit banknote occurring at a collection process of transporting the sheet stored in the first storage to the container for storage is stored in the first storage space.

9. A sheet processing apparatus, comprising:

a processing unit having an opening through which at least one of feeding a sheet in the apparatus or feeding the sheet out from the apparatus is performed;

a storage chamber having at least one of first storage which is configured to store the sheet fed in the apparatus;

an attachment unit which is provided at an outer surface of the processing unit or the storage chamber and to which a container for storing therein the sheet fed in the apparatus is capable of being mounted;

a transport mechanism configured to transport the sheet among the opening, the first storage, and the container; and a control unit configured to control the transport mechanism, wherein the opening includes a depositing unit and a dispensing unit, and the control unit is further configured to control the transport mechanism such that a first rejected sheet occurring at a first replenishing process of storing the sheet fed out from the depositing unit in the first storage and a second rejected sheet occurring at a second replenishing process of storing the sheet fed out from the container in the first storage are transported to different transport destinations, wherein the container includes at least two storage spaces, and the second rejected sheet is transported to a first storage space of the at least two storage spaces.

10. The sheet processing apparatus according to claim 9, wherein the first rejected sheet is transported to the opening.

* * * * *